US009497738B2

United States Patent
Choi et al.

(10) Patent No.: US 9,497,738 B2
(45) Date of Patent: Nov. 15, 2016

(54) METHOD AND APPARATUS FOR TRANSMITTING AND RECEIVING SIGNALS FOR DEVICE-TO-DEVICE COMMUNICATION IN WIRELESS COMMUNICATION SYSTEM

(71) Applicant: LG ELECTRONICS INC., Seoul (KR)

(72) Inventors: Hyeyoung Choi, Anyang-si (KR); Jaehoon Chung, Anyang-si (KR); Eunjong Lee, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/411,030

(22) PCT Filed: Jun. 5, 2013

(86) PCT No.: PCT/KR2013/004974
§ 371 (c)(1),
(2) Date: Dec. 23, 2014

(87) PCT Pub. No.: WO2014/003328
PCT Pub. Date: Jan. 3, 2014

(65) Prior Publication Data
US 2015/0195824 A1    Jul. 9, 2015

Related U.S. Application Data

(60) Provisional application No. 61/663,631, filed on Jun. 25, 2012, provisional application No. 61/671,788, filed on Jul. 15, 2012.

(51) Int. Cl.
*H04L 1/00*    (2006.01)
*H04W 72/04*    (2009.01)
(Continued)

(52) U.S. Cl.
CPC ........ *H04W 72/0406* (2013.01); *H04L 5/0048* (2013.01); *H04L 5/0053* (2013.01);
(Continued)

(58) Field of Classification Search
CPC .................. H04B 17/003; H04L 41/12; H04L 41/04; H04L 45/02; H04L 45/00;
(Continued)

(56) References Cited

U.S. PATENT DOCUMENTS

2009/0016285 A1    1/2009  Li et al.
2011/0299481 A1    12/2011  Kim et al.
(Continued)

FOREIGN PATENT DOCUMENTS

KR    10-2009-0080386    7/2009
KR    10-2009-0092434    9/2009
(Continued)

OTHER PUBLICATIONS

PCT International Application No. PCT/KR2013/004974, Written Opinion of the International Searching Authority dated Sep. 17, 2013, 18 pages.
(Continued)

*Primary Examiner* — Dady Chery
(74) *Attorney, Agent, or Firm* — Lee Hong Degerman Kang Waimey

(57) ABSTRACT

The present invention relates to a method for transmitting and receiving signals in a wireless communication system, where a second terminal transmits and receives a signal to and from a first terminal for device-to-device communication. The method includes the steps of: receiving a first signal from a first terminal; measuring a channel using the first signal and transmitting channel state information to a third terminal; and receiving control information from the third terminal in response to the transmission of the channel
(Continued)

state information, wherein the channel state information pertains to a communication link between the first and second terminals.

15 Claims, 16 Drawing Sheets

(51) Int. Cl.
*H04W 24/08* (2009.01)
*H04W 28/02* (2009.01)
*H04L 5/00* (2006.01)
*H04L 5/14* (2006.01)
*H04W 92/18* (2009.01)
*H04W 72/12* (2009.01)

(52) U.S. Cl.
CPC ............ *H04L 5/0057* (2013.01); *H04W 24/08* (2013.01); *H04W 28/0221* (2013.01); *H04W 72/048* (2013.01); *H04L 5/001* (2013.01); *H04L 5/0016* (2013.01); *H04L 5/0055* (2013.01); *H04L 5/1469* (2013.01); *H04W 72/1273* (2013.01); *H04W 92/18* (2013.01)

(58) Field of Classification Search
CPC ..................... H04L 45/04; H04L 43/50; H04L 43/0852; H04L 43/08; H04W 24/00; H04W 80/04; H04W 84/12; H04W 84/18; H04W 88/06; H04W 88/08; H04W 74/08

USPC .................................. 370/252, 254, 328, 338
See application file for complete search history.

(56) References Cited

U.S. PATENT DOCUMENTS

2011/0305179 A1    12/2011  Wang et al.
2013/0272196 A1*   10/2013  Li .......................... H04W 72/044
                                                            370/328

FOREIGN PATENT DOCUMENTS

KR    10-2009-0128304    12/2009
KR    10-2011-0033079     3/2011
KR    10-2011-0103852     9/2011
WO       2011/099798      8/2011
WO       2011/109941      9/2011

OTHER PUBLICATIONS

PCT International Application No. PCT/KR2013/007628, Written Opinion of the International Searching Authority dated Dec. 2, 2013, 1 page.

* cited by examiner

FIG. 9
(a)
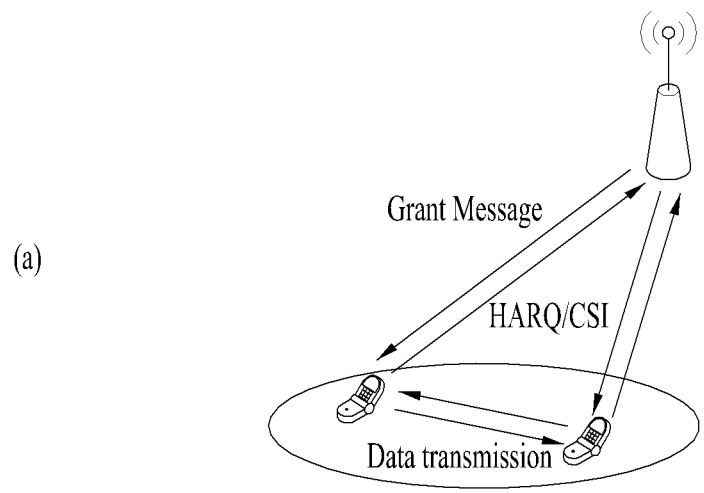
(b)
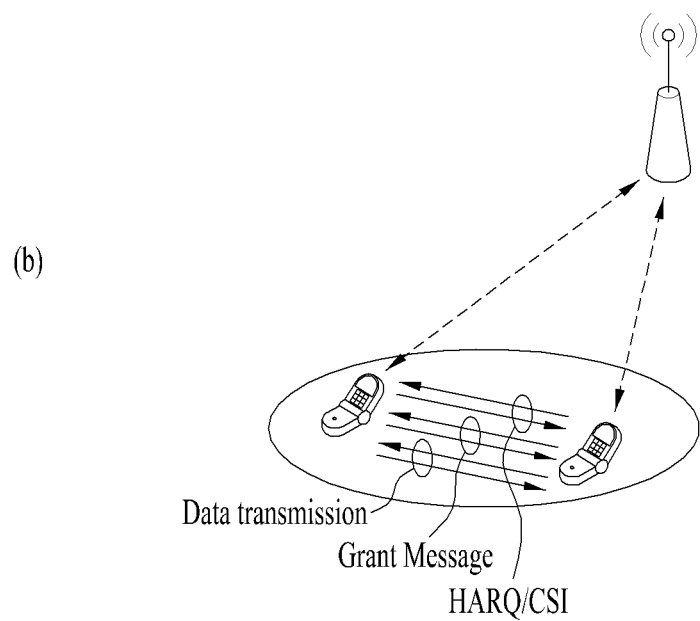

FIG. 12
(a)
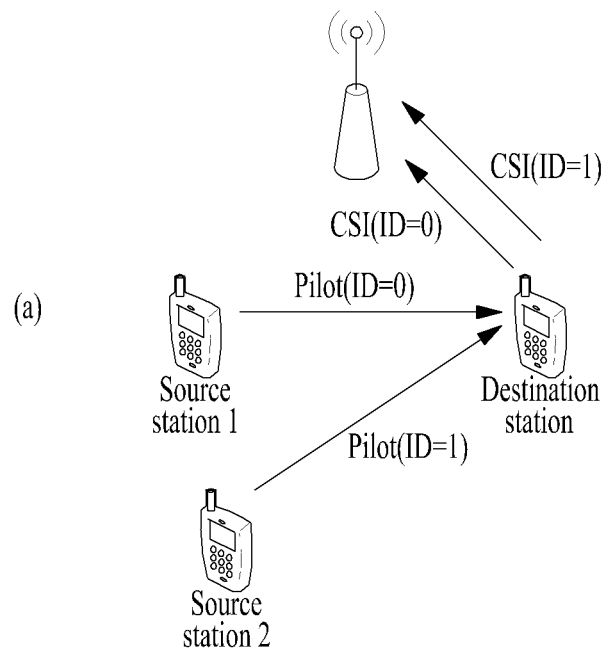
(b)
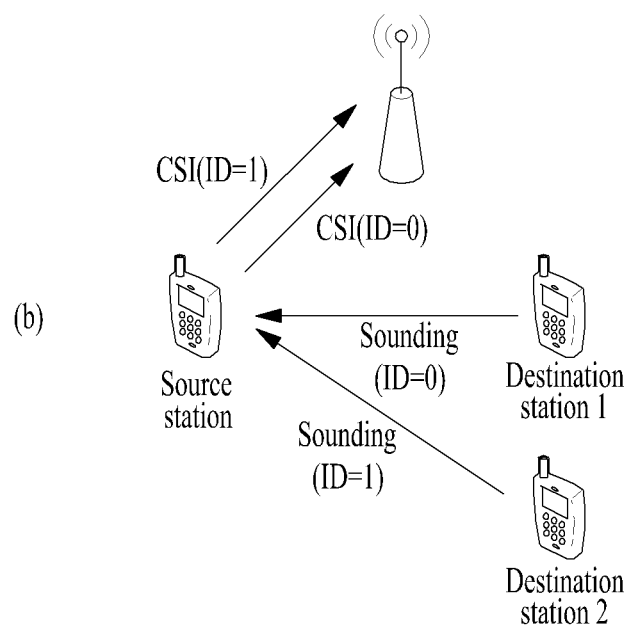

| Service Type | C-RNTI OF D2D COMMUNICATION UE OR LINK ID | Request/ Response |
|---|---|---|

(b)

| Connection ID | Request/ Response |
|---|---|

| Service Type | D2D 통신 대상 단말의 C-RNTI or Link ID | Request/ Response | Connection ID | Request/ Response |
|---|---|---|---|---|
| 0 | UE2 C-RNTI or link ID(UE1-UE2) | 0 | Connection ID (UE1-UE2, Type #0) | 0 |
| 0 | UE1 C-RNTI or link ID(UE1-UE2) | 0 | Connection ID (UE1-UE2, Type #0) | 0 |
| 0 | UE1 C-RNTI or link ID(UE1-UE2) | 1 | Connection ID (UE1-UE2, Type #0) | 1 |
| 0 | UE2 C-RNTI or link ID(UE1-UE2) | 1 | Connection ID (UE1-UE2, Type #0) | 1 |

(b)

| Service Type | D2D 통신 대상 단말의 C-RNTI or Link ID | Request/ Response | Connection ID | Request/ Response |
|---|---|---|---|---|
| 0 | UE1 C-RNTI or link ID(UE1-UE2) | 0 | Connection ID (UE1-UE2, Type #0) | 0 |
| 0 | UE2 C-RNTI or link ID(UE1-UE2) | 0 | Connection ID (UE1-UE2, Type #0) | 0 |
| 0 | UE2 C-RNTI or link ID(UE1-UE2) | 1 | Connection ID (UE1-UE2, Type #0) | 1 |
| 0 | UE1 C-RNTI or link ID(UE1-UE2) | 1 | Connection ID (UE1-UE2, Type #0) | 1 |

(c)

| Service Type | D2D 통신 대상 단말의 C-RNTI or Link ID | Request/ Response | Connection ID | Request/ Response |
|---|---|---|---|---|
| 0 | UE2 C-RNTI or link ID(UE1-UE2) | 0 | Connection ID (UE1-UE2, Type #0) | 0 |
| 0 | UE2 C-RNTI or link ID(UE1-UE2) | 1 | Connection ID (UE1-UE2, Type #0) | 1 |
| 0 | UE1 C-RNTI or link ID(UE1-UE2) | 1 | Connection ID (UE1-UE2, Type #0) | 1 |

(d)

| Service Type | D2D 통신 대상 단말의 C-RNTI or Link ID | Request/ Response | Connection ID | Request/ Response |
|---|---|---|---|---|
| 0 | UE1 C-RNTI or link ID(UE1-UE2) | 0 | Connection ID (UE1-UE2, Type #0) | 0 |
| 0 | UE2 C-RNTI or link ID(UE1-UE2) | 1 | Connection ID (UE1-UE2, Type #0) | 1 |
| 0 | UE1 C-RNTI or link ID(UE1-UE2) | 1 | Connection ID (UE1-UE2, Type #0) | 1 |

METHOD AND APPARATUS FOR TRANSMITTING AND RECEIVING SIGNALS FOR DEVICE-TO-DEVICE COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2013/004974, filed on Jun. 5, 2013, which claims the benefit of U.S. Provisional Application Ser. No. 61/663,631, filed on Jun. 25, 2012 and 61/671,788, filed on Jul. 15, 2012, the contents of which are all hereby incorporated by reference herein in their entirety.

TECHNICAL FIELD

The present invention relates to a method and apparatus for transmitting and receiving signals for Device to Device (D2D) communication in a wireless communication system.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system.

D2D communication refers to a communication scheme in which a direct link is established between User Equipments (UEs) and voice and data are transmitted between them via the direct link without intervention of an evolved Node B (eNB). D2D communication may include UE to UE communication, peer to peer communication, etc. D2D communication is applicable to Machine to Machine (M2M) communication, Machine Type Communication (MTC), etc.

D2D communication is considered as one of methods for mitigating the load of an eNB caused by rapidly increasing data traffic. For example, compared to a legacy wireless communication system, D2D communication can reduce the overload of a network because data is transmitted and received between devices without intervention of an eNB. Further, with the introduction of D2D communication, the effects of reduction of eNB processes, reduction of power consumption in D2D devices, the increase of data rate, the increase of network accommodation capability, load distribution, cell coverage extension, etc. are expected.

DISCLOSURE

Technical Problem

An object of the present invention devised to solve the conventional problem is to provide a method for transmitting and receiving channel state information for Device to Device (D2D) communication and/or a method for transmitting and receiving a scheduling request/response signal.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting and receiving a signal for Device to Device (D2D) communication with a first terminal by a second terminal in a wireless communication system includes receiving a first signal from the first terminal, measuring a channel using the first signal and transmitting channel state information to a third terminal, and receiving control information from the third terminal in response to the transmitted channel state information. The channel state information is about a communication link between the first terminal and the second terminal.

In an aspect of the present invention, a second terminal for performing D2D communication in a wireless communication system includes a transmission module, and a processor. The processor is configured to measure a channel using a first signal received from a first terminal, to transmit channel state information to a third terminal, and to receive control information from the third terminal in response to the transmitted channel state information, and the channel state information is about a communication link between the first terminal and the second terminal.

The first and second aspects of the present invention may include the followings.

The first signal may be received in a resource area indicated by information indicating the communication link between the first terminal and the second terminal.

The channel state information may include a scheduling request for a communication link to the first terminal.

The scheduling request may include information about a service type and information indicating the communication link between the first terminal and the second terminal.

The channel state information may include information indicating the communication link between the first terminal and the second terminal.

The channel state information may be transmitted in a resource area indicated by information indicating the communication link between the first terminal and the second terminal.

The channel state information may be transmitted in a resource area indicated by an index of resources in which the first signal is received.

If the channel state information includes a scheduling request for a communication link to the first terminal, the control information may include a grant for the scheduling request.

The control information may include information about a Modulation and Coding Scheme (MCS) used for the communication link between the first terminal and the second terminal.

The second terminal may attempt to receive the control information after a predetermined subframe from a subframe in which the channel state information is transmitted.

The first terminal may be a source station, the second terminal may be a destination station, the third terminal may be a coordination station, and the first signal may a pilot signal.

The first terminal may be a destination station, the second terminal may be a source station, the third terminal may be a coordination station, and the first signal may be a sounding signal.

Advantageous Effects

According to the present invention, Device to Device (D2D) communication can be performed efficiently.

The effects of the present invention will not be limited only to the effects described above. Accordingly, effects that have not been mentioned above or additional effects of the present application may become apparent to those having ordinary skill in the art from the description presented below.

DESCRIPTION OF DRAWINGS

FIG. 9 illustrates a drawing for explaining an example of D2D communication.

FIG. 12 illustrates a drawing for explaining generation/transmission of 1'st signal according to an exemplary embodiment of the present invention.

FIG. 13 to FIG. 15 illustrate drawings for describing SR request and response according to an exemplary embodiment of the present invention.

BEST MODE FOR CARRYING OUT THE INVENTION

Figure 1:
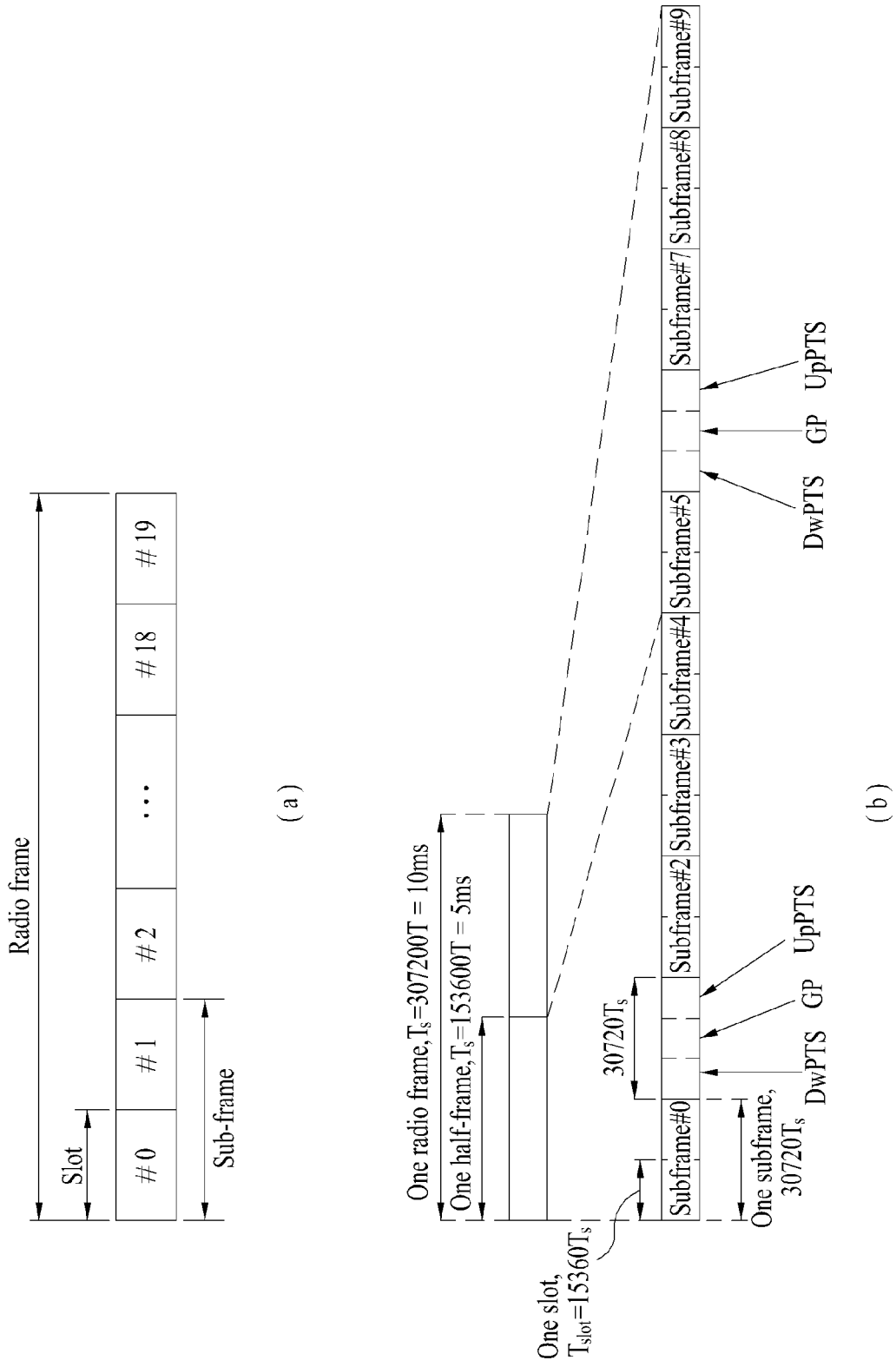
FIG. 1 illustrates an exemplary structure of a wireless frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied.

Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on. The term relay may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

FIG. 1 illustrates an exemplary structure of a wireless (or radio) frame being used in a 3GPP LTE system. Referring to FIG. 1(a), one wireless (or radio) frame includes 10 subframes, and one subframe includes 2 slots in a time domain. The time for transmitting one subframe is defined as a Transmission Time Interval (TTI). For example, one subframe may have the length of 1ms, and one slot may have the length of 0.5 ms. One slot may include a plurality of OFDM symbols in the time domain. Since the 3GPP LTE system uses the OFDMA method during a downlink, the OFDM symbol may indicate one symbol length (period). During an uplink, one symbol may be referred to as an SC-FDMA symbol or a symbol length. A Resource Block (RB) corresponds to a resource allocation unit, and, in a slot, the resource block (RB) includes a plurality of consecutive sub-carriers. However, the above-described wireless frame structure is merely exemplary. Therefore, the number of subframes included in a wireless frame, the number of slots included in one subframe, or the number of OFDM symbols being included in one slot may be varied in many different ways.

FIG. 1(b) illustrates an exemplary structure of a type 2 radio frame. The type 2 radio frame consists of 2 half frames. Each half frame consists of 5 subframes, a DwPTS (Downlink Pilot Time Slot), a Guard Period (GP), and an UpPTS (Uplink Pilot Time Slot). Herein, one subframe consists of 2 slots. The DwPTS is used for initial cell search, synchronization, or channel estimation, which are performed by a user equipment. The UpPTS is used for channel estimation, which is performed by a base station, and for uplink transmission synchronization, which is performed by the user equipment. The guard period corresponds to a period (or section) for eliminating interference occurring in an uplink due to a multiple path delay of a downlink signal between an uplink and a downlink.

Herein, the structure of the radio frame is merely exemplary. And, therefore, the number of subframes included in the radio frame or the number of slots included in a subframe, and the number of symbols included in one slot may be diversely varied.

Figure 2:
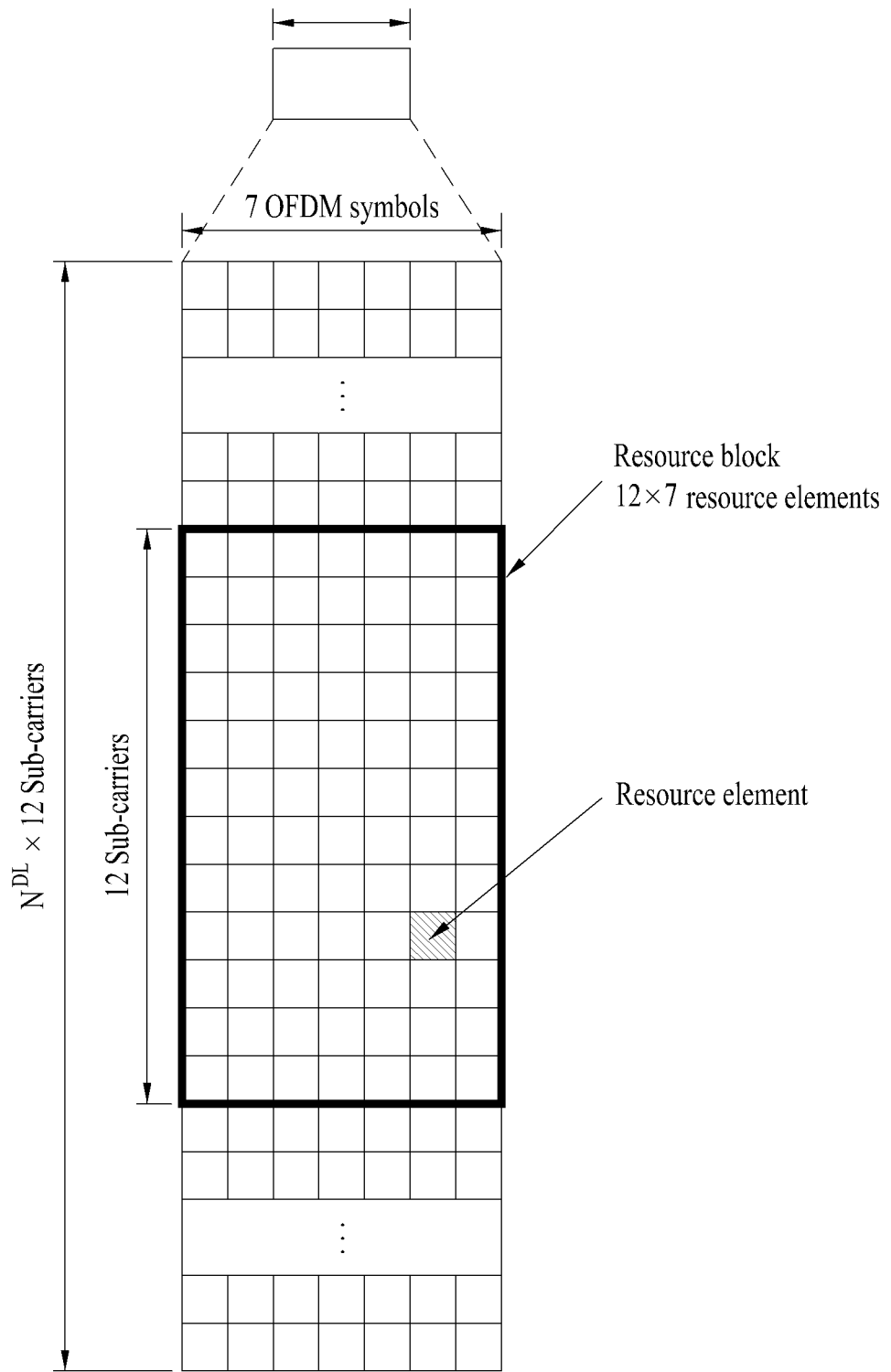
FIG. 2 illustrates a resource grid of a downlink slot.

FIG. 2 illustrates a resource grid of a downlink slot. Although it is shown in FIG. 2 that one downlink slot includes 7 OFDM symbols in a time domain, and that one resource block (RB) includes 12 sub-carriers in a frequency domain, this is merely exemplary. And, therefore, the present invention will not be limited only to the example presented in FIG. 2. For example, in case of a general Cyclic Prefix (CP), one slot includes 7 OFDM symbols. Alternatively, in case of an extended Cyclic Prefix (extended-CP), one slot may include 6 OFDM symbols. Referring to FIG. 2, each element configuring the resource grid is referred to as a resource element (RE). One resource block includes 12×7 resource elements. An NDL number of resource blocks included in a downlink slot may vary in accordance with a downlink transmission bandwidth. The structure of an uplink slot may be identical to the above-described structure of the downlink slot.

Figure 3:
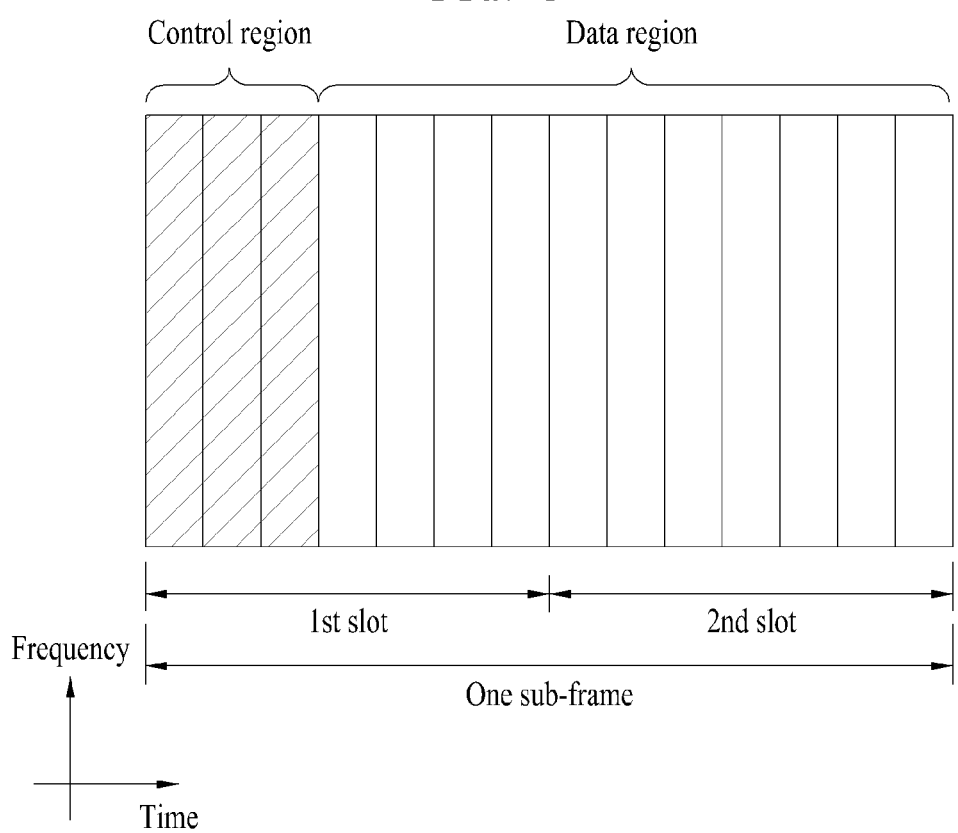
FIG. 3 illustrates an exemplary structure of a downlink subframe.

FIG. 3 illustrates an exemplary structure of a downlink subframe. A maximum of 3 OFDM symbols located at the front portion of a first slot within one subframe corresponds to a control region wherein a control channel is allocated (or assigned). The remaining OFDM symbols correspond to a data region wherein a Physical Downlink Shared Channel (PDSCH) is assigned. Downlink control channels that are being used in the LTE system may include a Physical Control Format Indicator Channel (PCFICH), a Physical Downlink Control Channel (PDCCH), a Physical Hybrid automatic repeat request Indicator Channel (PHICH), and so on.

The PCFICH includes information on the number of OFDM symbols being transmitted from the first OFDM symbol of a subframe and being used in the control channel transmission within the subframe.

As a response to an uplink transmission, the PHICH includes HARQ ACK/NACK signals. The PDCCH transmits Downlink Control Information (DCI). Depending upon its format, the DCI may include uplink or downlink scheduling information, or the DCI may include uplink transmission power control information respective to an arbitrary user equipment group.

DCI Format

According to the current LTE-A (release-10), DCI formats 0, 1, 1A, 1B, 1C, 1D, 2, 2A, 2B, 2C, 3, 3A, 4 are defined. Herein, DCI formats 0, 1A, 3, 3A have been regulated to have the same message size in order to reduce the number of sessions for blind decoding, which will be described later on. According to the purpose of the control information that is to be transmitted, such DCI formats may be divided into i) DCI formats 0, 4, which are used for uplink scheduling grants, ii) DCI formats 1, 1A, 1B, 1C, 1D, 2, 2A, 2B, 2C, which are used for downlink scheduling grants, and iii) DCI formats 3, 3A, which are used for power control commands.

In case of DCI format 0, which is used for an uplink scheduling grant, may include a carrier indicator being required with respect to carrier aggregation, which is to be described later on, an offset being used for differentiating DCI format 0 from DCT format 1A (flag for format 0/format 1A differentiation), a hopping flag indicating whether or not frequency hopping is being used in the uplink PUSCH transmission (frequency hopping flag), information on resource block allocation (or assignment) that is to be used by the user equipment for PUSCH transmission (resource block assignment), modulation and coding scheme, a new data offset being used for emptying a buffer for an initial transmission respective to an HARQ process (new data indicator), a transmission power control command for PUSCH (TPC command for scheduled for PUSCH), information on a cyclic shift for DMRS (Demodulation reference signal) (cyclic shift for DM RS and OCC index), an uplink index (UL index) required in a TDD operation, information requesting for Channel Quality Information (CSI request), and so on. Meanwhile, since DCI format 0 uses synchronized HARQ, DCI format 0 does not include a redundancy version as in the DCI formats that are related to downlink scheduling allocation. In case of a carrier offset, when cross-carrier scheduling is not used, the carrier offset is not included in the DCI format.

DCI format 4 is a format newly included in LTE-A release 10, and, herein, DCI format 4 is used for supporting the application of spatial multiplexing in an uplink transmission in the LTE-A. In comparison with DCI format 0, since DCI format 4 includes more information for spatial multiplexing, DCI format 4 has a larger message size and further includes additional control information in addition to the control information included in DCI format 0. More specifically, DCI format 4 further includes modulation and coding schemes for a second transport block (or transmission block), precoding information for multi-antennae transmission, sounding reference signal request (SRS request) information. Meanwhile, since DCI format 4 has a larger size than DCI format 0, DCI format 4 does not include an offset differentiating DCI format 0 from DCI format 1A.

DCI formats 1, 1A, 1B, 1C, 1D, 2, 2A, 2B, 2C, which are related to downlink scheduling grants, may be broadly divided into 1, 1A, 1B, 1C, 1D, which do not support spatial multiplexing, and 2, 2A, 2B, 2C, which support spatial multiplexing.

DCI format 1C supports only frequency contiguous assignment (or allocation) as compact downlink allocation, and, as compared to other formats, DCI format 1C does not support carrier offset, redundancy version.

DCI format 1A corresponds to a format for downlink scheduling and random access procedure. Herein, DCI format 1A may include a carrier offset, an indicator notifying whether or not a downlink distribution (or dispersion) transmission is being used, PDSCH resource allocation (or assignment) information, modulation and coding scheme, a redundancy version, an HARQ processor number for notifying a processor, which is used for soft combining, a new data offset being used for emptying a buffer for an initial transmission respective to an HARQ process (new data indicator), a transmission power control command for PUCCH, an uplink index (UL index) required in a TDD operation, and so on.

In case of DCI format 1, most of the control information is similar to DCI format 1A. However, as compared to the fact that DCI format 1A is related to contiguous resource allocation, DCI format 1 supports non-contiguous resource allocation. Therefore, since DCI format 1 further includes a resource allocation header, control signaling overhead may increase more or less as a trade-off in that the flexibility in resource allocation is increased.

As compared to DCI format 1, DCI formats 1B, 1D are identical to one another in that each of DCI formats 1B, 1D includes precoding information. DCI format 1B includes PMI verification, and DCI format 1D includes downlink power offset information. With the exception for such information, the control information included in DCI formats 1B, 1D is mostly identical to the control information of DCI format 1A.

DCI formats 2, 2A, 2B, 2C essentially include most of the control information included in DCI format 1A and further include information for spatial multiplexing. Herein, the further included information corresponds to modulation and coding schemes related to the second transport block, a new data offset, and a redundancy version.

DCI format 2 supports closed-loop spatial multiplexing, and DCI format 2A supports open-loop spatial multiplexing. Both formats include precoding information. DCI format 2B supports dual layer spatial multiplexing and further includes information on cyclic shift for DMRS. DCI format 2C may be understood as an extension of DCI format 2B and supports spaspatial multiplexing of up to eight layers.

DCI formats 3, 3A may be used to supplement the transmission power control information, which is included in the above-described DCI formats for uplink scheduling grant and downlink scheduling allocation (or assignment), i.e., may be used for supporting semi-persistent scheduling. In case of DCI format 3, a 1-bit command is used per user equipment, and, in case of DCI format 3A, a 2-bit command is used for user equipment.

Among the above-described DCI formats, any one DCI format may be transmitted through on PDCCH, and multiple PDCCHs may be transmitted within the control region. The user equipment may monitor multiple PDCCHs.

PDCCH Processing

In transmitting DCI within a PDCCH, a Cyclic Redundancy Check (CRC) is added (or attached) to the DCI, and, during this process, a Radio network temporary identifier (RNTI) is masked. Herein, in case of the RNTI, different RNTIs may be used depending upon the transmission purpose of the DCI. More specifically, in case of a paging message related to network initiated connection settings, P-RNTI may be used, when related to random access, RA-RNTI may be used, and when related to a System Information Block (SIB), SI-RNTI may be used. Additionally, in case of a unicast transmission, C-RNTI, which corresponding to a unique user equipment identifier, may be used. The DCI having CRC added thereto is coded at a predetermined coding rate, and, thereafter, the DCI is adjusted to best fit the resource size being used for the transmission through rate-matching.

In performing the above-described transmission of the PDCCH, a Control Channel Element (CCE), which corresponds to a contiguous logical allocation unit, is used when mapping the PDCCH to REs in order to perform efficient processing. The CCE is configured of 36 REs, and this corresponds to 9 Resource element group (REG) units. The number of CCEs that are required for a specific PDCCH may vary in accordance with a DCI payload, which corresponds to the size of the control information, a cell bandwidth, a channel coding rate, and so on. More specifically, the number of CCEs for a specific PDCCH may be defined as shown below in Table 1 in accordance with the PDCCH format.

TABLE 1

| PDDCH Format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

As shown in Table 1, the number of CCEs may vary depending upon the PDCCH format. Herein, for example, the transmitting end may adaptively used the IDDCH format, such as changing (or shifting) to PDCCH format 2, in case the channel state becomes poor (or degraded) while the transmitting end is using PDCCH format 0.

Blind Decoding

For the PDCCH, among the above-described four different formats, any one of the formats may be used. However, this is not notified to the user equipment. Therefore, in the position of the user equipment, the user equipment is required to perform decoding without knowing the PDCCH format, and, this is referred to as blind decoding. However, since having the UE decode all available CCEs being used in the downlink for each PDCCH format causes a large burden on the user equipment, a Search Space is defined based upon limitations of a scheduler and the number of decoding attempts.

More specifically, the search space corresponds to a group of candidate PDCCHs, which are configured of CCEs, which the user equipment is required to attempt decoding at an Aggregation Level. Herein, the aggregation level and the number of PDCCH candidates may be defined as shown below in Table 2.

TABLE 2

| | Search Space | | Number of |
|---|---|---|---|
| | Aggregation Level | Size (CCE units) | PDCCH Candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, since 4 different aggregation levels exist, the user equipment may have multiple search spaces in accordance with each aggregation level.

Additionally, as shown in Table 2, the search space may be divided into a UE-specific search space and a common search space. The UE-specific search space is designated for specific user equipments (UEs), wherein each UE may monitor the UE-specific search space (attempt to perform decoding on a PDCCH candidate group in accordance with an available DCI format), so as to verify the RNTI and CRC masked to the PDCCH. And, then, when the verified RNTI and CRC are valid, the UE may acquire the control information.

The common search space is designated for dynamic scheduling respective to system information or paging messages, and so on, such as a case when multiple user equipments or all user equipments are required to receive the PDCCH. However, the common search space may be used as a search space designated for a specific user equipment for resource management. Additionally, the common search space may be overlapped with the UE-specific search space.

Figure 4:
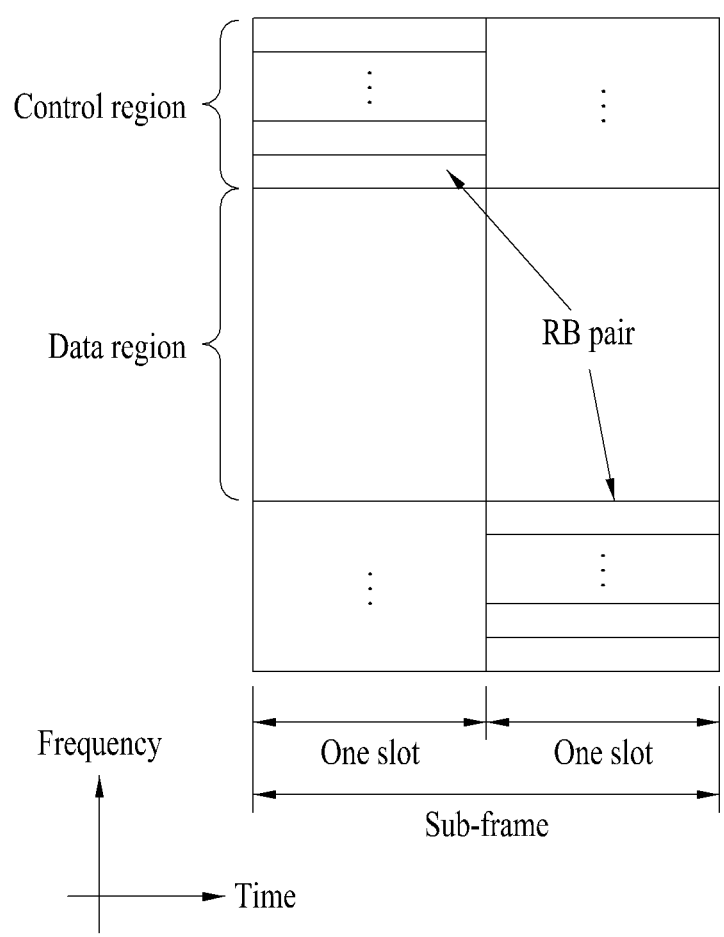
FIG. 4 illustrates an exemplary structure of an uplink subframe.

FIG. 4 illustrates an exemplary structure of an uplink subframe. In a frequency domain, an uplink subframe may be divided into a control region and a data region. A Physical Uplink Control Channel (PUCCH) including uplink control information is allocated to the control region. And, a Physical uplink shared channel (PUSCH) including user data is allocated to the data region. In order to maintain the characteristic of a unique (or single) carrier, one user equipment does not transmit the PUCCH and the PUSCH at the same time. The PUCCH for a user equipment is allocated to a resource block pair (RB pair) within a subframe. Each of the resource blocks (RBs) belonging to the RB pair occupies a different sub-carrier for 2 slots. This state may be referred to as the resource block pair, which is allocated to the PUCCH, as being frequency-hopped at the slot boundary.

PHICH (Physical Hybrid-ARQ Indicator Channel)

Figure 5:
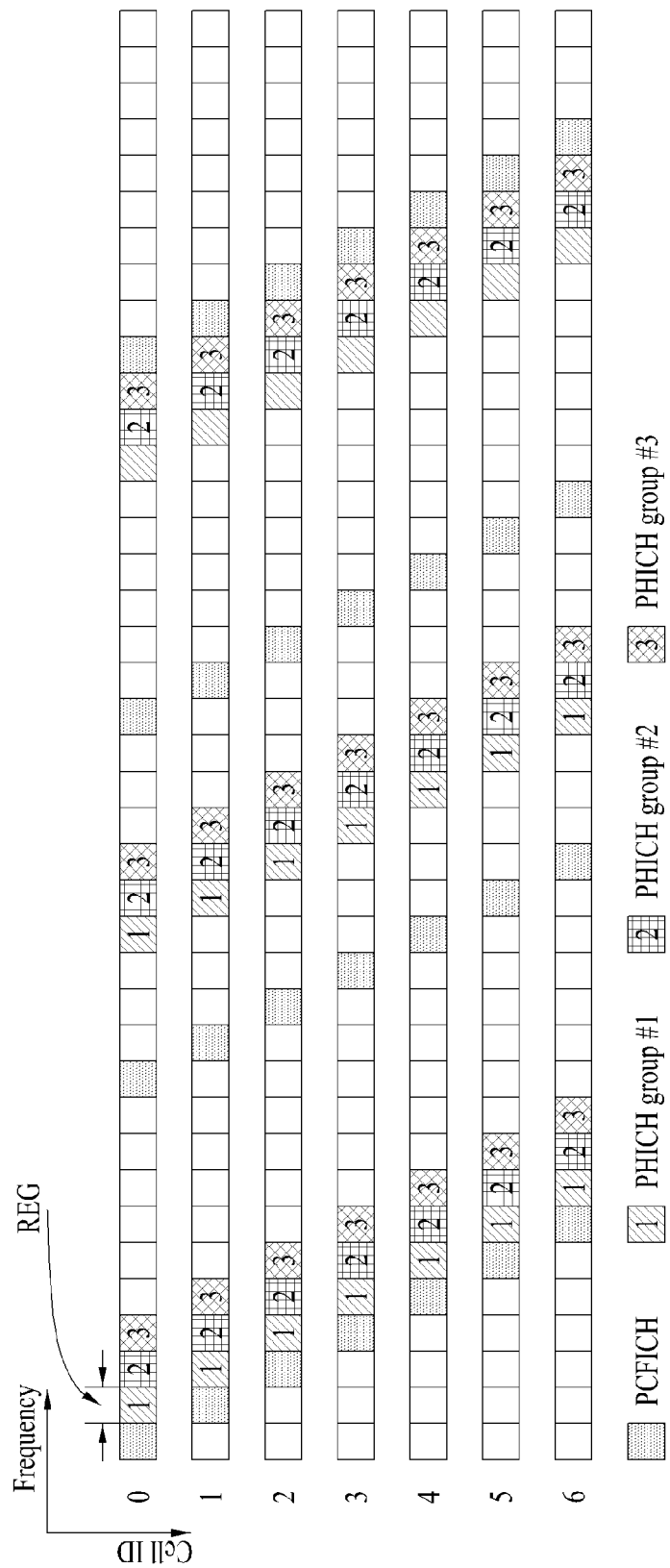
FIG. 5 illustrates appositions of PCFICH and PHICH channel generally applied in a specific bandwidth.

FIG. 5 illustrates appositions of PCFICH and PHICH channel generally applied in a specific bandwidth. ACK/NACK information on an uplink data transmission is transmitted through the PHICH. A plurality of PHICH groups is configured in one subframe, and multiple PHICHs exist in one PHICH group. Accordingly, PHICH channels respective to multiple user equipments exist in one PHICH group.

As shown in FIG. 5, in the multiple PHICH groups, the PHICH allocation for each user equipment is realized by using a lowest Physical Resource Block (PRB) index of PUSCH resource allocation and a Cyclic Shift index for a Demodulation RS (DMRS), which is transmitted through an uplink grant PDCCH. The DMRS corresponds to an uplink reference signal, and the DMRS corresponds to a signal that is being provided along with an uplink transmission for channel estimation for demodulating uplink data. Additionally, the PHICH resource may be notified through an index pair, such as ($n_{PHICH}^{group}$, $n_{PHICH}^{seq}$), and, at this point, in ($n_{PHICH}^{group}$, $n_{PHICH}^{seq}$), $n_{PHICH}^{group}$ indicates a PHICH group number, and $n_{PHICH}^{seq}$ indicates an orthogonal sequence index within a corresponding PHICH group. $n_{PHICH}^{group}$ and $n_{PHICH}^{seq}$ may be defined as shown below in Equation 1.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$ [Equation 1]

In Equation 1, $n_{DMRS}$ corresponds to a cyclic shift that is applied to a DMRS, which is used for an uplink transmission related to PHICH, and $n_{DMRS}$ is mapped to a 'cyclic shift for DMRS' field of a most recent uplink grant control information (e.g., DCI format 0 or 4) respective to a transport block (TB), which is related to the corresponding PUSCH transmission. For example, the 'cyclic shift for DMRS' field of a most recent uplink grant DCI format may have the size of 3 bits, and, when this field is given a value of '000', $n_{DMRS}$ may be set to have a value of '0'.

In Equation 1, $N_{SF}^{PHICH}$ corresponds to a spreading factor size, which is used for PHICH modulation. $I_{PRB\_RA}^{lowest\_index}$ corresponds to a lowest PRB index within a first slot of the corresponding PUSCH transmission. $I_{PHICH}$ is assigned with a value of 1 only in a special case (a case when settings are made to UL/DL configuration 0, and when PUSCH transmission is performed in subframe n=4 or 9) within a TDD system, and $I_{PHICH}$ is assigned with a value of 0 in other cases. $N_{PHICH}^{group}$ corresponds to a number of PHICH groups set up by a higher layer and may be defined as shown below in Equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$ [Equation 2]

In Equation 2, $N_g$ corresponds to information on the amount (or size) of a PHICH resource being transmitted to a Physical Broadcast Channel (PBCH), and $N_g$ has a size of 2 bits and is expressed as ($N_g \in \{1/6, 1/2, 1, 2\}$). In Equation 2, $N_{RB}^{DL}$ corresponds to a number of resource blocks being set up in a downlink.

Additionally, an example of an orthogonal sequence, which is defined in the legacy (or conventional) 3GPP LTE release 8/9, is shown below in Table 3.

| Sequence index $n_{PHICH}^{seq}$ | Orthogonal sequence | |
|---|---|---|
| | Normal cyclic prefix $N_{SP}^{PHICH} = 4$ | Extended cyclic prefix $N_{SF}^{PHICH} = 2$ |
| 0 | [+1 +1 +1 +1] | [+1 +1] |
| 1 | [+1 −1 −1 +1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 6:
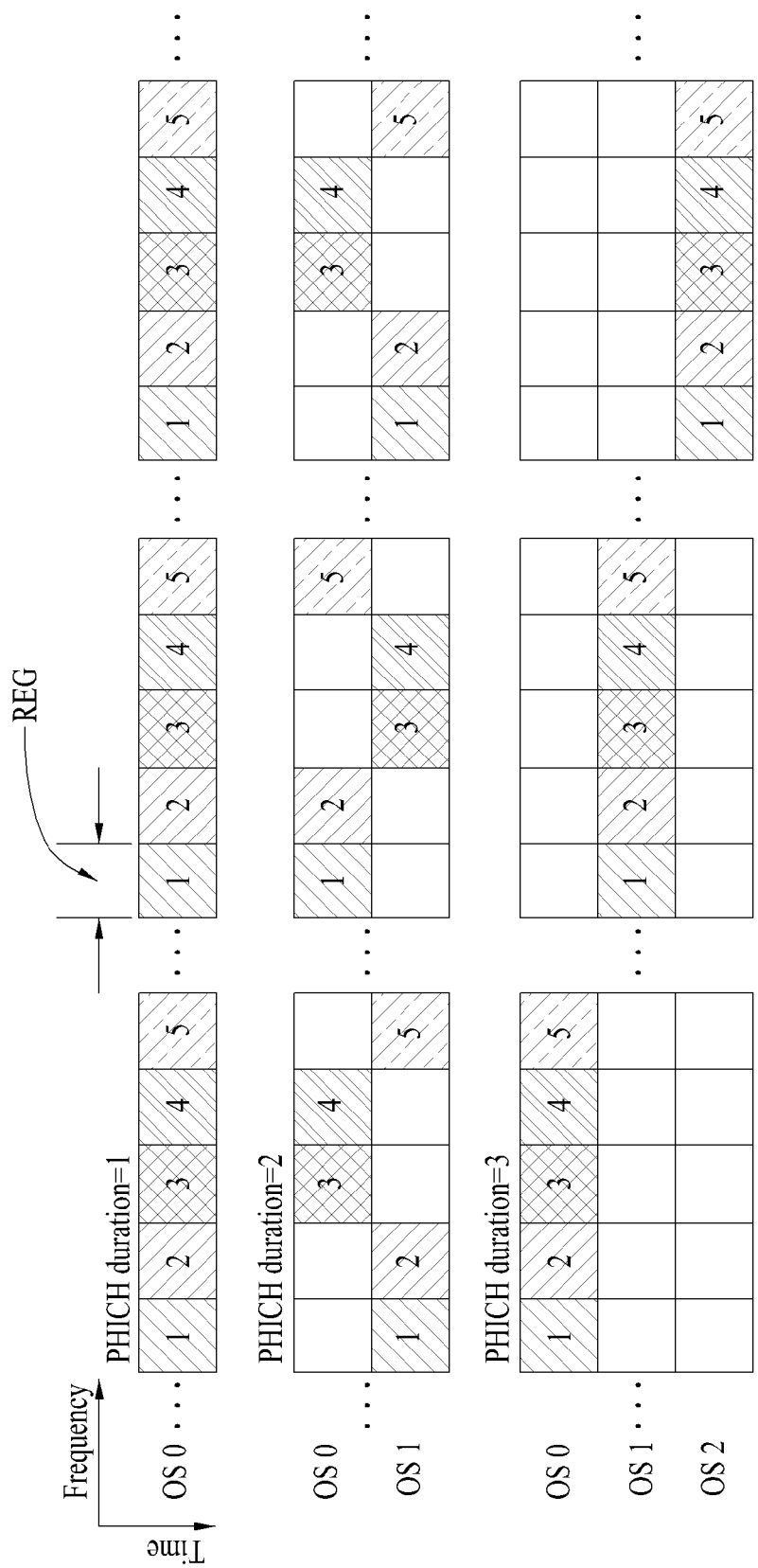
FIG. 6 illustrates a position of a downlink element having a PHICH group mapped thereto.

FIG. 6 illustrates a position of a downlink element having a PHICH group mapped thereto. Depending upon the PHICH duration, as shown in FIG. 9, the PHICH group may be configured in a difference time domain (i.e., a different OS (OFDM Symbol)) within one subframe.

Carrier Aggregation

Figure 7:
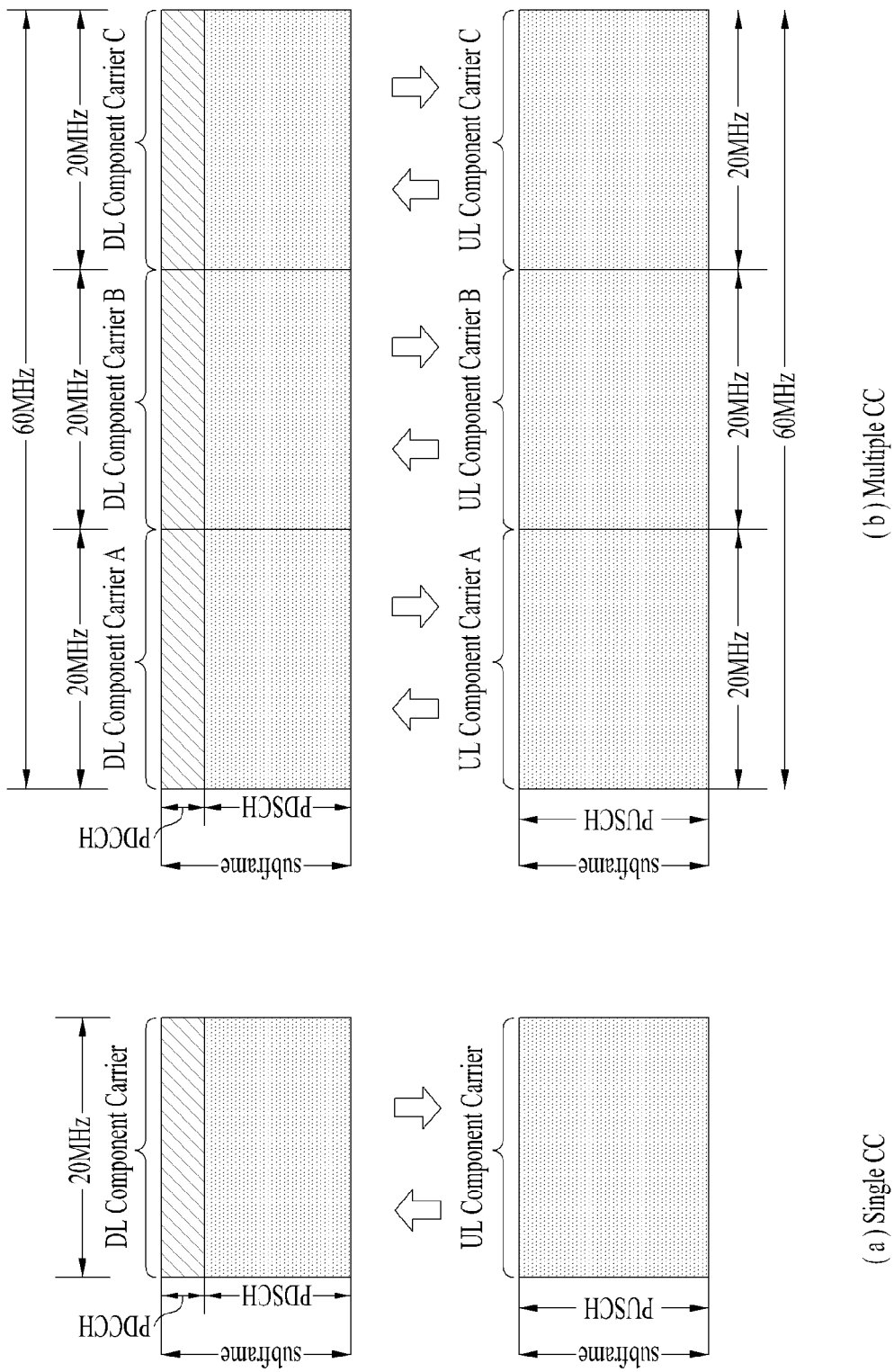
FIG. 7 illustrates a drawing for describing carrier aggregation.

FIG. 7 illustrates a drawing for describing carrier aggregation. Prior to describing carrier aggregation, the concept of a cell being adopted for managing radio resources in the LTE-A will hereinafter be described firsthand. A cell may be understood as a combination of a downlink resource and an uplink resource. Herein, the uplink resource does not correspond to an essential element, and, therefore, a cell may be configured only of a downlink resource or may be configured of both the downlink resource and the uplink resource. However, this is a definition established in the current LTE-A release 10. And, an opposite case may also be realized, i.e., a cell may be configured only of the uplink resource. The downlink resource may be referred to as a Downlink component carrier (DL CC), and the uplink resource may be referred to as an Uplink component carrier (UL CC). The DL CC and the UL CC may be expressed as carrier frequency, and the carrier frequency signifies a center frequency within the corresponding cell.

A cell may be divided into a primary cell (PCell), which operates in a primary frequency, and a secondary cell (SCell), which operates in a secondary frequency. The PCell and the SCell may be collectively referred to as a serving cell. In case of the PCell, a cell being designated when the user equipment performs an initial connection establishment procedure or during a connection re-establishment procedure or a handover procedure, may become the PCell. More specifically, the PCell may be understood as a cell that becomes a control-related center in carrier aggregation environment, which will be described in detail later on. The user equipment may be assigned (or allocated) with the PUCCH from its own PCell and may then transmit the allocated PUCCH. The SCell may be configured after RRC (Radio Resource Control) connection establishment, and the SCell may be used for providing additional radio resource. In the carrier aggregation environment, all serving cells excluding the PCell may be viewed as the SCell. In case of a user equipment that is in an RRC_CONNECTED state, yet in case carrier aggregation is not set up or is case the user equipment does not support carrier aggregation, only a single serving cell consisting only of PCells exist. Conversely, in case of a user equipment that is in the RRC_CONNECTED state and that is set up with carrier aggregation, at least one or more serving cells exist, and PCells and all SCells are included in all serving cells. For a user equipment supporting carrier aggregation, after an initial security activation procedure is initiated, the network may configure at least one or more SCells in additional to the PCell, which is configured at the beginning of the connection establishment procedure.

Hereinafter, carrier aggregation will be described with reference to FIG. 7. Carrier aggregation corresponds to a technology that has been adopted to allow the usage of a broader (or wider) band in order to meet with the requirements of a high-speed transmission rate. Carrier aggregation may be defined as an aggregation of at least 2 or more component carriers (CCs), each having a different frequency. Referring to FIG. 7, FIG. 7(a) illustrates a subframe in a case when one CC is used in the legacy LTE system, and FIG. 7(b) illustrates a subframe in a case when carrier aggregation is being used. For example, it is illustrates in FIG. 7(b) that 3 CCs of 20 MHz are used, thereby supporting a bandwidth of a total of 60 MHz. Herein, each CC may be continuous or may be non-continuous (or discontinuous).

The user equipment may simultaneously receive and monitor downlink data from a plurality of DL CCs. A linkage between each DL CC and UL CC may be designated by the system information. The DL CC/UL CC link may be fixed to the system or may be semi-statically configured. Additionally, even if the entire system band is configured of N number of CCs, the frequency band through which a specific user equipment may perform monitoring/reception may be limited M(<N) number of CCs. Diverse parameters respective to carrier aggregation may be set up by a cell-specific method, a UE group-specific or UE-specific method.

Figure 8:
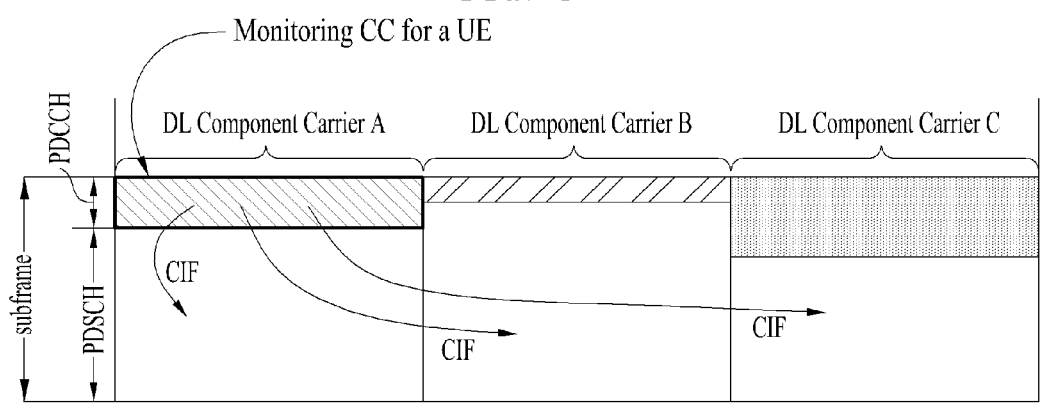
FIG. 8 illustrates a drawing for describing cross-carrier scheduling.

FIG. 8 illustrates a drawing for describing cross-carrier scheduling. Cross-carrier scheduling, for example, refers to all downlink scheduling allocation information of another DL CC being included in the control region of any one DL CC, among multiple serving cells, or all uplink scheduling authorization (or certification) information respective to multiple UL CCs linked to any one DL CC being included in the control region of the one DL CC, among multiple serving cells.

First of all, a carrier indicator field (CIF) will be described in detail.

As described above, the CIF may either be included or not included in the DCI format, which is being transmitted through the PDCCH. And, in case the CIF is included in the DCI format, this indicates that cross-carrier scheduling is applied. In case cross-carrier scheduling is not applied, the downlink scheduling allocation information is valid within the DL CC through which current downlink scheduling allocation information is being transmitted. Additionally, the uplink scheduling authorization is valid for a UL CC, which is linked to the DL CC through which the downlink scheduling allocation information is being transmitted.

In case cross-carrier scheduling is being applied, the CIF indicates a CC related to the downlink scheduling allocation information, which is transmitted through the PDCCH from any one DL CC. For example, referring to FIG. 8, downlink allocation information, i.e., information on PDSCH resource, respective to DL CC B and DL CC C is transmitted through the PDCCH within the control region of DL CC A. The user equipment may monitor DL CC A, so as to figure out the resource area of the PDSCH and the corresponding CC through the CIF.

Whether the CIF is included or not included in the PDCCH may be semi-statically set up, and the CIF may be UE-specifically activated (or enabled) by higher-layer signaling. In case the CIF is disabled, the PDCCH of a specific DL CC allocates PDSCH resource of the same DL CC and may also allocate PUSCH resource of a UL CC, which is linked to the specific DL CC. In this case, the same coding method, CCE based resource mapping, DCI format, and so on, as the legacy PDCCH structure may be applied.

Meanwhile, in case the CIF is enabled, the PDCCH of a specific DL CC may allocate PDSCH/PUSCH resource within a single DL/UL CC being indicated by the CIF, among the multiple aggregated CCs. In this case, a CIF may be additionally defined in the legacy PDCCH DCI format, and the CIF may be defined as a field having a fixed length of 3 bits, or the CIF position may be fixed regardless of the DCI format size. In this case also, the same coding method, CCE based resource mapping, DCI format, and so on, as the legacy PDCCH structure may be applied.

In case the CIF exists, the base station may allocation a DL CC set, which is intended to monitor the PDCCH. Accordingly, the burden of blind decoding of the UE may be decreased. The PDCCH monitoring CC set corresponds to a portion of the entire aggregated DL CC, and the user equipment may perform PDCCH detection/decoding only in the corresponding CC set. More specifically, in order to perform PDSCH/PUSCH scheduling with respect to the user equipment, the base station may transmit the PDCCH only over the PDCCH monitoring CC set. The PDCCH monitoring CC set may be UE-specifically or UE group-specifically or cell-specifically set up. For example, as shown in the example of FIG. 8, when 3 DL CCs are aggregated, DL CC A may be set up as the PDCCH monitoring DL CC. In case the CIF is disabled, the PDCCH of each DL CC may schedule only the PDSCH within the DL CC A. Meanwhile, when the CIF is enabled, in addition to the DL CC A, the PDCCH of DL CC A may also schedule the PDSCH of other DL CCs. In case the DL CC A is set up as the PDCCH monitoring CC, the PDSCCH is not transmitted to DL CC B and the DL CC C.

In a system having the above-described carrier aggregation applied thereto, the user equipment may receive multiple PDSCH through multiple downlink carriers. And, in this case, there may occur a case when the user equipment is required to transmit ACK/NACK respective to each data set from one UL CC within a single subframe. When multiple ACK/NACKs are being transmitted from a single subframe by using PUCCH format 1a/1b, a high transmission power is required, PAPR of an uplink transmission is increased, and, due to an inefficient usage of a transmission power amplifier, the available transmission distance of the user equipment from the base station may be decreased. In order to transmit multiple ACK/NACKs through a single PUCCH, ACK/NACK bundling or ACK/NACK multiplexing may be applied.

Additionally, there may occur a case when ACK/NACK information respective to a large number of downlink data sets according to the application of carrier aggregation and/or ACK/NACK information respective to a large number of downlink data sets being transmitted from a plurality of DL subframes in a TDD system is required to be transmitted through the PUCCH in a single subframe. In such case, if the number if ACK/NACK bits that are to be transmitted is larger than the number of bits available for support through ACK/NACK bundling or multiplexing, the ACK/NACK information may not be correctly transmitted by using the above-described methods.

A description will be given of methods for performing D2D communication between UEs in the above-described LTE/LTE-A system. D2D communication schemes may be classified largely into network/coordination station (e.g., eNB)-assisted D2D communication and non-assisted D2D communication. Referring to FIG. 9, a network/coordination station intervenes in transmission and reception of a control signal (e.g., a grant message), HARQ, CSI, etc. and only data transmission and reception are performed between D2D UEs in FIG. 9(*a*). In FIG. 9(*b*), a network provides only minimal information (e.g., information about a D2D connection available in a cell) and D2D UEs establish a link and perform data transmission and reception via the link. The following description is given of a CSI measurement/reporting method for a D2D communication link and an SR method in the network/coordination station-assisted D2D communication scheme.

CSI Measurement/Reporting Method for D2D Communication Link

Figure 10:
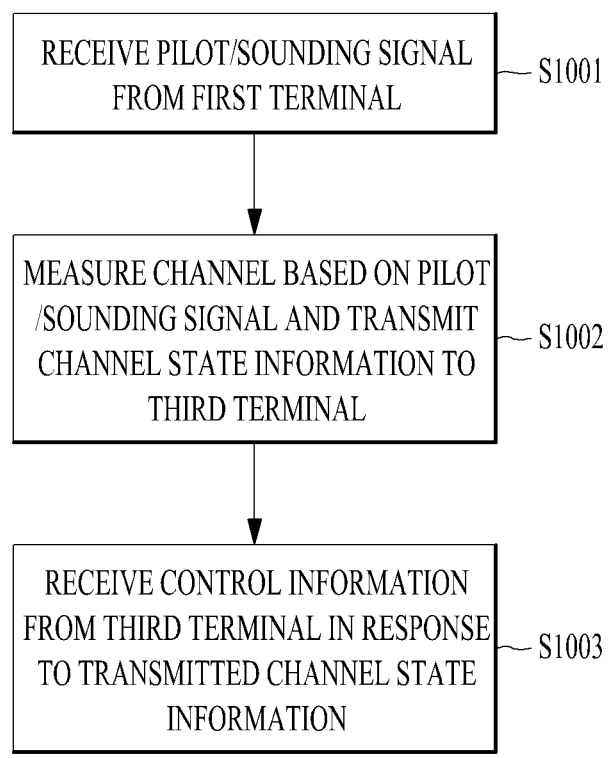
FIG. 10 illustrates a drawing for method for measurement/report of D2D communication link according to an exemplary embodiment of the present invention.

FIG. 10 is a flowchart illustrating a CSI measurement/reporting method for a D2D communication link according to an embodiment of the present invention.

Referring to FIG. 10, a second terminal may receive a first signal (e.g., a pilot signal or a sounding signal) from a first terminal in step S1001. After the first terminal confirms that the first and second terminals are ready for D2D communication through an SR procedure, the first terminal may transmit the first signal to the second terminal. That is, upon receipt of a response signal indicating that the first terminal is allowed to perform D2D communication with the second terminal through the SR procedure, the first terminal may transmit the first signal to the second terminal. This case is useful when a small amount of resources are available for transmission of the first signal and the probability of the resulting collision is high. However, if a small number of UEs attempt D2D communication, sufficient resources are available for transmission of the first signal, or the probability of collision is low, the first terminal may not need to transmit the first signal in conjunction with the SR procedure. The first terminal or the second terminal is a UE/station capable of D2D communication, which may be one of a source station and a destination station as described later with reference to FIG. 11.

In step S1002, the second terminal may generate CSI by measuring/estimating a channel (e.g., measures a Signal to Noise Ratio (SNR) or Signal to Interference plus Noise Ratio (SINR) of the channel) based on the received first signal and transmit the generated CSI to a third terminal. The third terminal may be an afore-described coordination station (e.g., an eNB).

In step S1003, the second terminal may receive control information in response to the CSI. Upon receipt of the CSI from the second terminal, the third terminal may transmit control information including information about a Modulation and Coding Scheme (MCS), a grant message, etc. The control information may be transmitted (simultaneously) to the third terminal as well as the second terminal. The control information may be transmitted separately or commonly to each of the second and third terminals.

Figure 11:
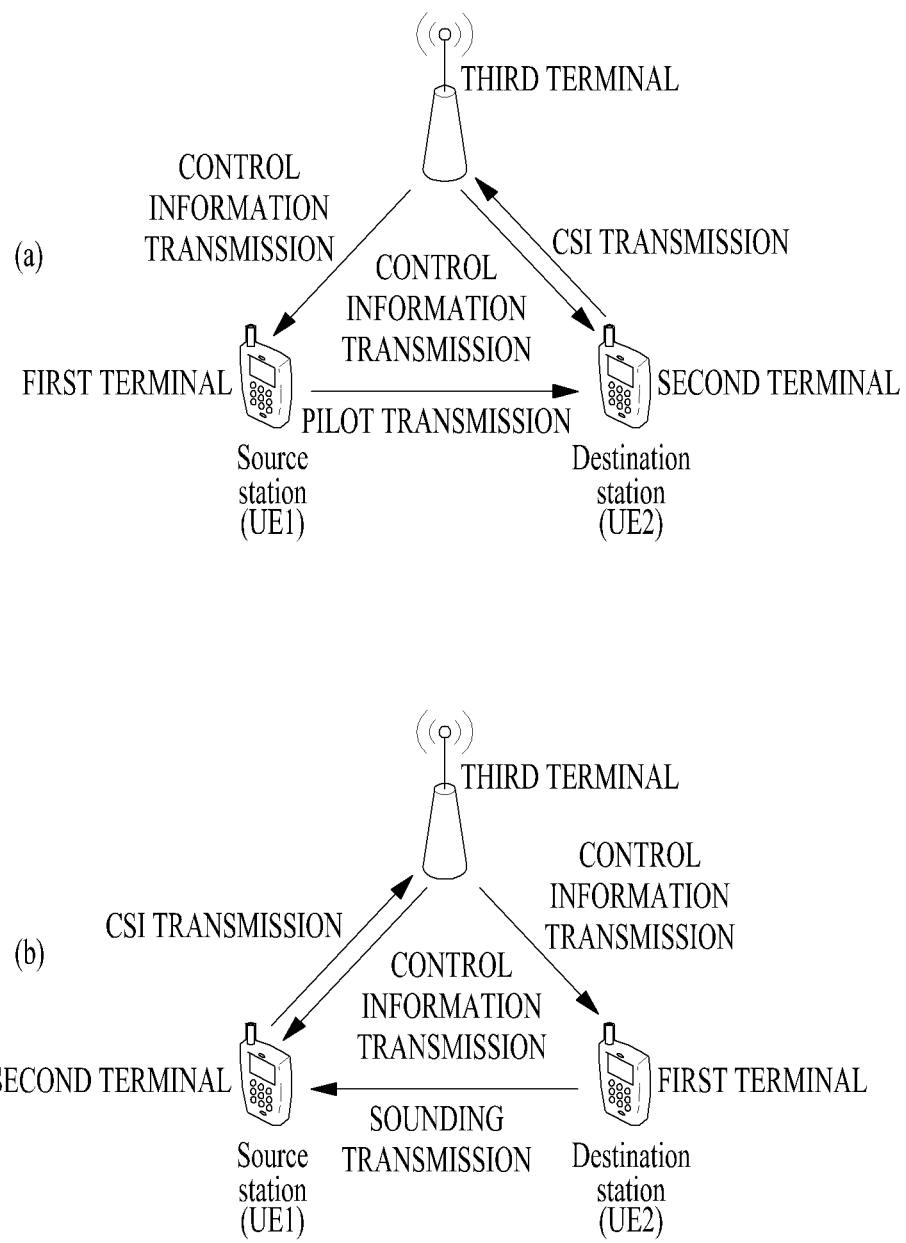
FIG. 11 illustrates a drawing for example of CSI measurement report according to an exemplary embodiment of the present invention.

FIG. 11 illustrates examples of CSI reporting described above with reference to FIG. 10. Referring to FIG. 11(*a*), it is noted that a first terminal is a source station, a second terminal is a destination station, and a first signal is a pilot signal. More specifically, in the presence of data to be transmitted to the destination station and/or upon receipt of a response signal indicating that D2D communication is available in an SR procedure, the first terminal being the source station may transmit a pilot signal to the destination station. Upon receipt of the pilot signal from the source station UE1, the destination station UE2 may measure or estimate CSI using the pilot signal and transmit the measured or estimated CSI to a coordination station. If the coordination station receives the CSI and succeeds in decoding the CSI, the coordination station may determine an MCS for use in data transmission/reception between the source station and the destination station and transmit a control signal (e.g., a grant message, etc.). Herein, the coordination station may transmit a control signal (e.g., a grant message, etc.) separately to each of the source station and the destination. Or the coordination station may transmit the same control signal (e.g., the same grant message, etc.) to the source station and the destination station.

Referring to FIG. 11(b), it is noted that a first terminal is a destination station, a second terminal is a source station, and a first signal is a sounding signal. The sounding signal may be a Sounding Reference Signal (SRS) in the existing LTE/LTE-A system. More specifically, if the destination station wants to receive data from the source station and/or receives a response signal indicating that D2D communication is available in an SR procedure, the destination station may transmit a sounding signal to the source station. When the source station UE1 receives the sounding signal from UE2, UE1 may measure or estimate CSI (e.g., an SNR or SINR) using the sounding signal and transmit the CSI to a coordination station. Then if the coordination station receives the CSI and succeeds in decoding the CSI, the coordination station may determine an MCS for use in data transmission/reception between the source station and the destination station and transmit a control signal (e.g., a grant message, etc.). Herein, the coordination station may transmit a control signal (e.g., a grant message, etc.) separately to each of the source station and the destination station. Or the coordination station may transmit the same control signal (e.g., the same grant message, etc.) to the source station and the destination station.

In relation to the above description, a detailed description will be given of generation of a pilot signal/sounding signal (for the convenience of description, referred to as a first signal as mentioned before), resources used in transmission of the first signal, CSI generation, resources used in transmission of CSI, and a transmission timing of each signal.

First, the first signal may be generated in a contention-based or non-contention-based manner. In the contention-based case, a signal to be transmitted may be selected from a specific set (a set of parameters related to generation of the first signal or a set of pre-generated first signals). The specific set may be predefined, indicated by higher-layer signaling, or determined in consideration of C-RNTIs of terminals and information (e.g., a link ID or a connection ID) indicating a communication link between the first terminal and the second terminal. In the non-contention-based case, information for generating the first signal (e.g., an indicator indicating a specific set from among predefined sets) may be transmitted by RRC signaling or MAC signaling during (or before/after) connection of an RRC link for D2D communication.

Second, resources related for transmission of the generated first signal may be a resource area indicated (implicitly) by the information (e.g., the link ID or the connection ID) indicating the communication link between the first terminal and the second terminal. FIG. 12 illustrates such examples. Specifically, FIG. 12(a) illustrates an example in which the first signal is a pilot signal. Source station 1 may transmit a pilot signal in a resource area indicated by a link ID or connection ID (ID=0 in FIG. 12(a)) indicating a communication link between source station 1 and a destination station. Source station 2 may transmit a pilot signal in a resource area indicated a link ID or connection ID (ID=1 in FIG. 12(a)) indicating a communication link between source station 2 and the destination station. Therefore, when source station 1 and source station 2 transmit pilot signals simultaneously to the destination station, the destination station may identify the stations that transmit the pilot signals by the resource areas carrying the pilot signals. FIG. 12(b) illustrates an example in which the first signal is a sounding signal. A detailed description of FIG. 12(b) is pursuant to the description of FIG. 12(a).

Third, CSI may include information indicating the communication link between the first terminal and the second terminal in order to indicate a terminal whose communication link is related to CSI transmitted by the second terminal (if the first signal is a pilot signal, the second terminal is a destination station and if the first signal is a sounding signal, the second terminal is a source station). Specifically, a new format including CSI and a link ID (or a connection ID) may be configured and transmitted. A service type field may be included in the new format. The new format may be transmitted in a legacy PUCCH region/PUSCH region. Upon receipt of the first signal, the second terminal measures/estimates channel information (e.g., an SNR or SINR) and feeds back the channel information to the third terminal, that is, the coordination station.

The generated CSI may include an SR. The SR may be configured in a legacy LTE/LTE-A SR format or a later-described SR format. The SR may be transmitted separately from the CSI.

Fourth, resources used for transmission of the CSI may be allocated/determined explicitly or implicitly to indicate the communication link to which the transmitted CSI is related. In the case of implicit allocation/determination, resources used in transmission of the CSI may be a resource area indicated (implicitly) by the information (e.g., the link ID or the connection ID) indicating the communication link between the first and second terminals. That is, the coordination station may determine a link (or a connection) to which the received CSI is related and thus may perform scheduling (including MCS determination) based on the link (or the connection). Because the CSI resource area of D2D communication should not collide with a legacy PUCCH region, a dedicated resource area for D2D communication may be defined. Or a PUSCH region may be used for the CSI resource area of D2D communication. In the case of explicit allocation/determination, the CSI resource area may be an area indicated explicitly or implicitly in the legacy PUCCH region. Or the PUSCH region may be used for the CSI resource area of D2D communication. Herein, a new format carrying both the CSI and the link ID (or the connection ID) may be defined.

Fifth, transmission timings of the above-described signals may be predefined in order to prevent a terminal from blind-decoding a grant message directed to the terminal in every subframe, which may happen if a transmission timing is not predefined. The same or different timings may be defined according to subframe configurations of B2D communication or D2D communication.

For example, if the source station transmits a pilot signal in an $n^{th}$ subframe and the destination station receives the pilot signal and transmits CSI (or an SR) in an $(n+k)^{th}$ subframe, the coordination station may transmit a grant message for D2D communication in an $(n+q)^{th}$ subframe. The source station and the destination may attempt to detect the grant message for D2D communication only in the $(n+q)^{th}$ subframe using the predefined timing. Herein, n is an arbitrary integer and k and q are arbitrary integers equal to or larger than 0.

SR Request/Response Signal for D2D Communication

Figure 13:
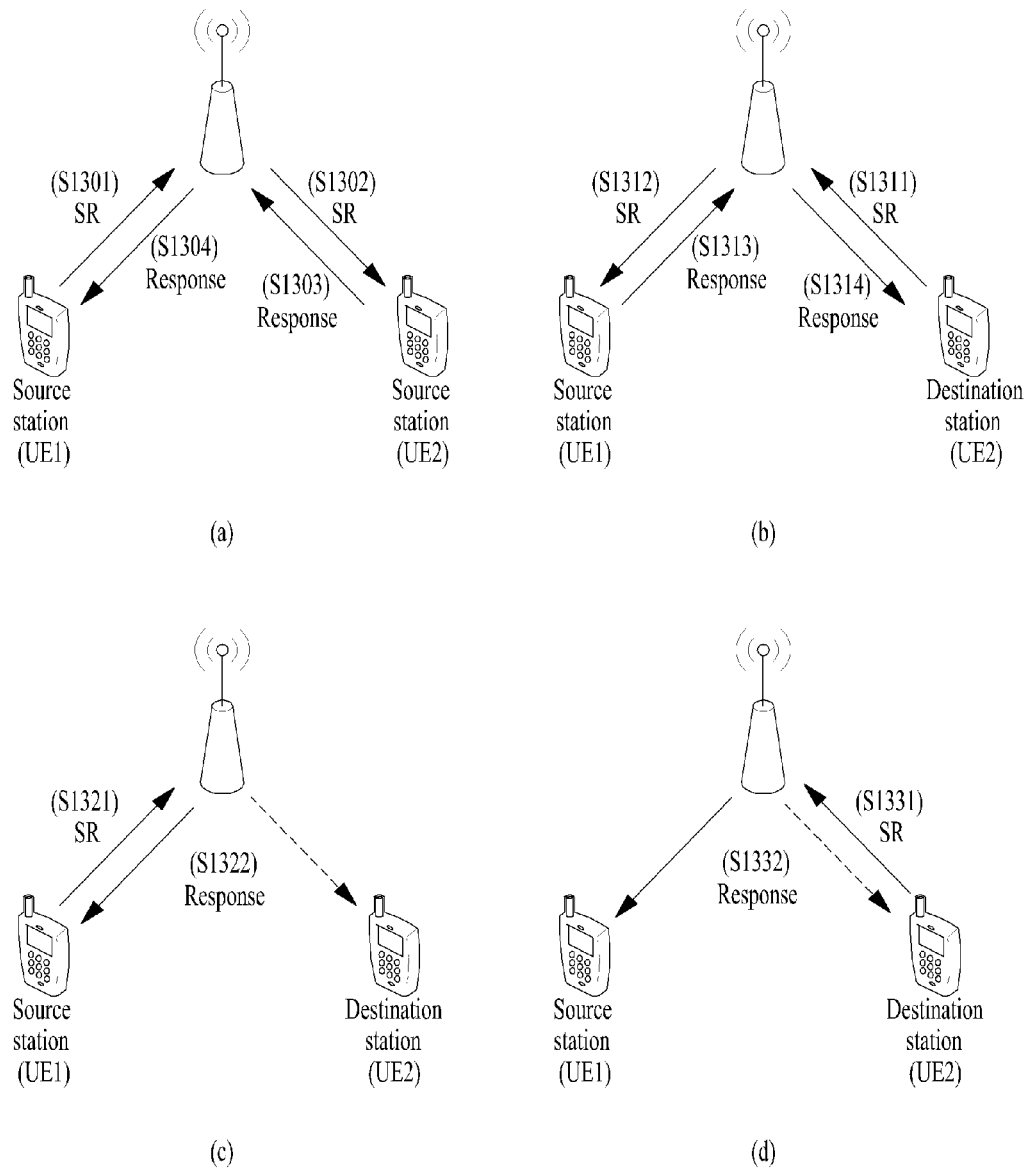

With reference to FIGS. 13, 14, and 15, transmission of the afore-described SR and a response to the SR will be described below in detail.

FIG. 13 illustrates transmission and reception of an SR request and response for D2D communication according to embodiments of the present invention.

Referring to FIG. 13(*a*), in the presence of data to be transmitted to a D2D communication station with which a link has been established with a source station, the source station indicates to a coordination station (e.g., an eNB, a UE, etc.) the presence of data to be transmitted to a destination station by an SR or transmission request signal in step S1301. The source station may also indicate the service type of the transmission data. For example, the source station may indicate what service type of data it will transmit among various service types including VoIP, FTP, HTTP, etc.

In step S1302, if the coordination station (e.g., the eNB, the UE, etc.) receives the SR or transmission request signal and succeeds in decoding the received signal, the coordination station transmits to the destination station a signal indicating that the source station has data to be transmitted to the destination station. The coordination station may also transmit information about the service type received from the source station to the destination station.

In step S1303, if the destination station receives the signal from the coordination station and succeeds in decoding the received signal, the destination station may indicate to the coordination station a specific station from which the destination station wants to receive data from among stations that want to transmit data to the destination station by a response signal. The destination station may select the station from which data is to be received according to the priority levels of links to source stations that want to transmit data to the destination station. For example, if data has a time-sensitive service type such as VoIP, the destination station may receive the data with priority over other service types. If a source station has transmitted an SR or transmission request signal a plurality of times but has failed to receive a response signal from the destination station, the destination station may select the source station by increasing the priority level of a link to the source station to thereby receive data from the source station with priority over other links.

In step S1304, if the coordination station receives from the destination station the response signal indicating a specific source station from which the destination station wants to receive data and succeeds in decoding the response signal, the coordination station indicates to the specific source station that the destination station wants to perform D2D communication with the specific source station by a response signal. The coordination station may also indicate a service type to the specific source station. If the source station receives the response signal from the coordination station and succeeds in decoding the response signal, the source station may be aware that the source station is allowed to transmit data to the destination station. Herein, the service type may also be indicated.

Referring to FIG. 13(*b*), if a destination station wants to receive data from a D2D communication station with which a link has been established with the destination station, the destination station indicates to a coordination station (e.g., an eNB, a UE, etc.) that the destination station is ready to receive data from a source station by an SR or transmission request signal in step S1311. The destination station may also indicate the service type of the data that it may receive. For example, the destination station may request what service type of data it wants to receive among various service types including VoIP, FTP, HTTP, etc.

In step S1312, when the coordination station (e.g., the eNB, the UE, etc.) receives the SR or transmission request signal from the destination station and succeeds in decoding the received signal, the coordination station transmits to the source station a signal indicating that the destination station wants to receive data from the source station. The coordination station may also transmit information about the service type received from the destination station.

In step S1313, if the source station receives the signal from the coordination station and succeeds in decoding the signal, the source station may select a specific station to which it wants to transmit data from among destination stations that want to receive data from the source station and indicate the selected specific station to the coordination station by transmitting a response signal. The source station may select the station to which data is to be transmitted according to the priority levels of links to destination stations that want to receive data from the source station. For example, if data has a time-sensitive service type such as VoIP, the source station may transmit the data with priority over other service types. If a destination station has transmitted an SR or transmission request signal a plurality of times but has failed to receive a response signal from the source station, the source station may select the destination station by increasing the priority level of a link to the destination station to thereby transmit data to the destination station with priority over other links.

In step S1314, if the coordination station receives from the source station a response signal indicating that the source station will transmit data to the destination station and succeeds in decoding the response signal, the coordination station indicates to the destination station indicated by the signal received from the source station that the specific source station wants to transmit data to the destination station by a response signal. The coordination station may also indicate a service type. If the destination station receives the response signal from the coordination station and succeeds in decoding the response signal, the destination station may be aware that it will receive data from the source station. Herein, the service type may also be indicated. In this manner, the destination station may indicate to a source station used as a kiosk of a shop or a device used for advertisement that the destination station wants to receive data from the source station.

Referring to FIG. 13(*c*), if a link is established for D2D communication between a source station and a destination station and then the source station has data to be transmitted to the destination station, the source station indicates to a coordination station that the source station has data to be transmitted to the destination station by an SR (or transmission request) signal in step S1321. Herein, information about the service type of the data to be transmitted may also be transmitted.

When the coordination station receives the SR (or transmission request) signal from the source station and succeeds in decoding the received signal, the coordination station may select a source station from among source stations requesting data transmission to the destination station, taking into account the link priority levels of the source stations. The coordination station may select a source station having a high-priority service type, taking into account service types or a source station that has transmitted an SR (or transmission request) to the destination station a plurality of times in the presence of such a source station to ensure fairness between D2D terminals. In step S1322, the coordination station indicates to the source station selected in the above operation that the source station may transmit data to the destination station by a response signal. In addition, the coordination station may indicate to the destination station that the destination station will receive data or a pilot signal from the selected source station by a response signal (indicated by a dotted line). In this case, the destination station may monitor a control signal or a pilot signal only when it receives a response signal, rather than the destination station continuously monitors a control signal or a pilot signal for data reception. Or the coordination station may not indicate to the destination station the source station selected to transmit data to the destination station by a response signal. Then the destination station should monitor a control signal or a pilot signal continuously.

Referring to FIG. 13(d), if a link is established for D2D communication between a source station (e.g., a kiosk of a shop or a device used for advertisement) and a destination station and then the destination station wants to receive data from the source station, the destination station indicates to a coordination station that the destination station wants to receive data from the source station by an SR (or transmission request) signal in step S1331. Herein, the destination station may also transmit information about the service type of data to be received. When the coordination station receives the SR (or transmission request) signal from the destination station and succeeds in decoding the received signal, the coordination station may select a destination station from among destination stations requesting data transmission to the source station, taking into account the link priority levels of the destination stations. The coordination station may select a destination station having a high-priority service type, taking into account service types or a destination station that has transmitted an SR (or transmission request) a plurality of times in the presence of such a destination station to ensure fairness between D2D terminals. In step S1332, the coordination station indicates to the source station that the source station may transmit data to the destination station selected in the above operation by a response signal. Further, the coordination station may indicate to the destination station that the destination station will receive data or a pilot signal from the source station by a response signal. In this case, the destination station may monitor a control signal or a pilot signal only when it receives a response signal, rather than the destination station continuously monitors a control signal or a pilot signal for data reception. Or the coordination station may not indicate to the destination station the source station selected to transmit data to the destination station by a response signal. Then the destination station should monitor a control signal or a pilot signal continuously.

FIG. 14 illustrates exemplary formats of an SR request/response signal that are applicable to an embodiment of the present invention.

According to an embodiment of the present invention, an SR request (or transmission request) signal and a response signal should carry a C-RNTI of a terminal or a link ID, or a connection ID. A service type may be optimally included in the SR request (or transmission request) signal and the response signal. The same format or different formats may be defined for the SR request (or transmission request) signal and the response signal.

In the example of the SR request/response signal illustrated in FIG. 14(a), a link ID identifies a link between a source station and a destination station. A connection ID identifies an application communicating on the link between the source station and the destination. A field may be added to or a specific field may be removed from the format. For example, a field carrying information related to resources of a pilot signal that a source station wants to transmit or information for generation of a pilot signal after transmission/reception of an SR (or transmission request)/response may be added to the response signal format. When two terminals transmit/receive data for different applications via the same link, the service type is used to distinguish the applications from each other. For example, service type #0 may be defined for SNS service and thus a service type set to '0' may be transmitted to indicate the SNS service. In addition, service type #1 may be defined for VoIP service and thus a service type set to '1' may be transmitted to indicate the VoIP service. In the exemplary format, a field carrying a C-RNTI or link ID of a terminal for D2D communication may exist. Further, the format may include a request/response indicator field indicating whether the format is for an SR (or transmission request) signal or a response signal. FIG. 14(b) illustrates an exemplary SR request/response signal including a connection ID instead of the service type and link ID fields, and a request/response indicator field indicating whether this signal is an SR (or transmission request) signal or a response signal.

FIG. 15 illustrates exemplary SR fields transmitted in the cases illustrated in FIGS. 13(a) to 13(d). In the examples of FIG. 15, it is assumed that the service type of data transmitted to UE2 by UE1 is #0, if the request/response indicator is '0', it means a request, and if the request/response indicator is '1', it means a response.

Referring to FIG. 15(a), if a source station UE1 wants to transmit data with service type #0 to UE2, UE1 may transmit an SR (or transmission request) signal to a coordination station. The SR (or transmission request) signal may include service type '0', a C-RNTI of UE2 or the ID of a link between UE1 and UE2, and request/response indicator '0' indicating a request signal. A connection ID may be transmitted instead of the service type '0' and the C-RNTI of UE2 or the ID of the link between UE1 and UE2. Herein, an eNB may pre-configure resources for UE1, the link, and/or the connection by a higher layer signal. The resources may be related to a C-RNTI of UE1, the ID of the link between UE1 and UE2, and/or the connection ID. Upon receipt of the SR (or transmission request) signal from the source station UE1, the eNB transmits a request signal including service type '0', the C-RNTI of UE1 or the ID of the link between UE1 and UE2, and request/response indicator '0' to the destination station, UE2. The connection ID may be transmitted instead of service type '0' and the C-RNTI of UE1 or the ID of the link between UE1 and UE2. The eNB may transmit the request signal in a search space in which UE2 performs blind decoding or resources predefined (e.g., configured by a higher layer signal) for decoding at UE2. The resources may be related to the C-RNTI of UE2, the ID of the link between UE1 and UE2, or the connection ID. If the destination station UE2 receives the request signal from the coordination station and succeeds in decoding the request signal, UE2 may acquire information about the source station that has requested data transmission to UE2 from the request signal. The destination station may select a source station from which it wants to receive data, taking into account the priority level of a link between the two stations, from among such source stations. The destination station may transmit a response signal to the coordination station in order to indicate to the selected station that the source station may transmit data. In the example, UE1 is selected as the source station for the convenience of description. The response signal may include service type '0', the C-RNTI of UE1 or the ID of the link between UE1 and UE2, and request/response indicator '1' indicating a response signal. Service type '0', and the C-RNTI of UE1 or the ID of the link between UE1 and UE2 may be replaced with the connection ID. Herein, the eNB may pre-configure resources for UE2, the link, and/or the connection by a higher layer signal. The resources may be related to the C-RNTI of UE2, the ID of the link between UE1 and UE2, or the connection ID. If the coordination station receives the response signal from the destination station and succeeds in decoding the response signal, the coordination station may be aware that the source station UE1 may transmit data to the destination station to which the coordination station has transmitted the SR (or transmission request) signal and may transmit a response signal indicating it to UE1. The response signal may include service type '0', the C-RNTI of UE2 or the ID of the link between UE1 and UE2, and request/response indicator '1' indicating a response signal. Service type '0', and the C-RNTI of UE2 or the ID of the link between UE1 and UE2 may be replaced with the connection ID. The eNB may transmit the response signal in a search space in which UE1 performs blind decoding or resources predefined (e.g., configured by a higher layer signal) for decoding at UE1. The resources may be related to the C-RNTI of UE1, the link ID, or the connection ID. Upon receipt of the response signal, UE1 may be aware that UE1 may transmit data to UE2.

Referring to FIG. 15(b), if a destination station UE2 wants to receive data with service type #0 from UE1, UE2 may transmit an SR (or transmission request) signal to a coordination station. The SR (or transmission request) signal may include service type '0', a C-RNTI of UE1 or the ID of a link between UE1 and UE2, and request/response indicator '0' indicating a request signal. A connection ID may be transmitted instead of service type '0' and the C-RNTI of UE1 or the ID of the link between UE1 and UE2. Herein, an eNB may pre-configure resources for UE2, the link, or the connection by a higher layer signal. The resources may be related to the C-RNTI of UE2, the ID of the link between UE1 and UE2, or the connection ID. Upon receipt of the SR (or transmission request) signal from the destination station UE2, the eNB transmits a request signal including service type '0', the C-RNTI of UE2 or the ID of the link between UE1 and UE2, and request/response indicator '0' to the source station UE1. The connection ID may be transmitted instead of service type '0' and the C-RNTI of UE2 or the ID of the link between UE1 and UE2. The eNB may transmit the response signal in a search space in which UE1 performs blind decoding or resources predefined (e.g., configured by a higher layer signal) for decoding at UE1. The resources may be related to the C-RNTI of UE1, the link ID, or the connection ID. If the source station UE1 receives the request signal from the coordination station and succeeds in decoding the request signal, UE1 may acquire information about the destination station that has requested data reception from UE1. The source station may select a destination station that wants to receive data from the source station, taking into account the priority level of a link between the two stations, from among such destination stations. The source station may transmit a response signal to the coordination station in order to indicate to the selected destination station that the source station will transmit data to the destination station. In the example, UE2 is selected as the destination station, for the convenience of description. The response signal may include service type '0', the C-RNTI of UE2 or the ID of the link between UE1 and UE2, and request/response indicator '1' indicating a response signal. Service type '0', and the C-RNTI of UE2 or the ID of the link between UE1 and UE2 may be replaced with the connection ID. Herein, the eNB may pre-configure resources for UE1, the link, or the connection by a higher layer signal). The resources may be related to the C-RNTI of UE1, the ID of the link between UE1 and UE2, or the connection ID. If the coordination station receives the response signal from the source station and succeeds in decoding the response signal, the coordination station may transmit to the destination station UE2 a response signal indicating that UE2 may transmit data to the source station UE1 to which the coordination station has transmitted the SR request (or transmission request) signal. The response signal may include service type '0', the C-RNTI of UE1 or the ID of the link between UE1 and UE2, and request/response indicator '1' indicating a response signal. Service type '0', the C-RNTI of UE1 or the ID of the link between UE1 and UE2 may be replaced with the connection ID. The eNB may transmit the response signal in a search space in which UE2 performs blind decoding or resources predefined (e.g., configured by a higher layer signal) for decoding at UE2. The resources may be related to the C-RNTI of UE2, the link ID, or the connection ID.

Referring to FIG. 15(c), if a source station UE1 wants to transmit data with service type #0 to a destination station UE2, UE1 may transmit an SR (or transmission request) signal to a coordination station. The SR (or transmission request) signal may include service type '0', a C-RNTI of UE2 or the ID of a link between UE1 and UE2, and request/response indicator '0' indicating a request signal. A connection ID may be transmitted instead of service type '0' and the C-RNTI of UE2 or the ID of the link between UE1 and UE2. Herein, an eNB may pre-configure resources for UE1, the link, or the connection by a higher layer signal. The resources may be related to a C-RNTI of UE1, the ID of the link between UE1 and UE2, or the connection ID. If the eNB receives the SR (or transmission request) signal from the source station and succeeds in decoding the received signal, the eNB may select a source station that will transmit data to UE2, taking into account the priority level of links of source stations that has transmitted the SR (or transmission request) to the destination station UE2 and the state of UE2. In the example, UE1 is selected as the source station to transmit data to UE2, for the convenience of description. The coordination station indicates to the selected source station UE1 that UE1 may transmit data to UE2 by a response signal. The response signal may include service type '0', the C-RNTI of UE2 or the ID of the link between UE1 and UE2, and request/response indicator '1' indicating a response signal. The service type '0', and the C-RNTI of UE2 or the ID of the link between UE1 and UE2 may be replaced with the connection ID. Herein, the eNB may transmit the response signal in a search space in which UE1 performs blind decoding or resources predefined (e.g., configured by a higher layer signal) for decoding at UE1. The resources may be related to the C-RNTI of UE1, the link ID, or the connection ID. The coordination station may transmit information about the selected source station to the destination station UE2 by a response signal. The response signal may include service type '0', the C-RNTI of UE1 or the ID of the link between UE1 and UE2, and request/response indicator '1' indicating a response signal. The connection ID may be transmitted instead of service type '0', and the C-RNTI of UE2 or the ID of the link between UE1 and UE2. The eNB may transmit the response signal in a search space in which UE2 performs blind decoding or resources predefined (e.g., configured by a higher layer signal) for decoding at UE2. The resources may be related to the C-RNTI of UE2, the link ID, or the connection ID. The eNB may transmit response signals separately to UE1 and UE2 or may simultaneously transmit the same information including the connection ID, etc. in the format of one response signal to UE1 and UE2.

Referring to FIG. 15(d), if a destination station UE2 wants to transmit data with service type #0 to a source station UE1, UE2 may transmit an SR (or transmission request) signal to a coordination station. The SR (or transmission request) signal may include service type '0', a C-RNTI of UE1 or the ID of a link between UE1 and UE2, and request/response indicator '0' indicating a request signal. A connection ID may be transmitted instead of service type '0' and the C-RNTI of UE1 or the ID of the link between UE1 and UE2. Herein, an eNB may pre-configure resources for UE2 the link, or the connection by a higher layer signal. The resources may be related to the C-RNTI of UE2, the ID of the link between UE1 and UE2, or the connection ID. If the eNB receives the SR (or transmission request) signal from UE2 and succeeds in decoding the received signal, the eNB may select a destination station which wants to receive data from the source station, taking into account the link priority levels of destination stations that have transmitted an SR (or transmission request) to the source station UE1 and the state of UE2. In the example, UE1 is selected to transmit data to UE2, for the convenience of description. The coordination station indicates to the source station UE1 that UE1 may transmit data to the selected destination UE2 by a response signal. The response signal may include service type '0', the C-RNTI of UE2 or the ID of the link between UE1 and UE2, and request/response indicator '1' indicating a response signal. Service type '0' and the C-RNTI of UE2 or the ID of the link between UE1 and UE2 may be replaced with the connection ID. Herein, the eNB may transmit the response signal in a search space in which the source station UE1 performs blind decoding or resources predefined (e.g., configured by a higher layer signal) for decoding at UE1. The resources may be related to the C-RNTI of UE1, the link ID, or the connection ID. The coordination station may indicate to the destination station UE2 that UE1 may transmit data to UE2 by a response signal. The response signal may include service type '0', the C-RNTI of UE1 or the ID of the link between UE1 and UE2, and request/response indicator '1' indicating a response signal. Service type '0' and the C-RNTI of UE2 or the ID of the link between UE1 and UE2 may be replaced with the connection ID. The eNB may transmit the response signal in a search space in which UE2 performs blind decoding or resources predefined (e.g., configured by a higher layer signal) for decoding at UE2. The resources may be related to the C-RNTI of UE2, the link ID, or the connection ID. The eNB may transmit response signals separately to UE1 and UE2 or may simultaneously transmit the same information including the connection ID, etc. in the format of one response signal to UE1 and UE2.

The format of the above-described SR request/response signal may be transmitted on a UL control channel or a UL data channel. The response format may also be transmitted on a UL control channel or a UL data channel. A specific subframe or slot may be configured as resources for transmission of the SR (or transmission request)/response signal. The resources for transmission of the SR (or transmission request)/response signal may be configured cell-specifically or UE-specifically. Information about the resources may be transmitted by an RRC signal or a MAC signal, or may be predefined (e.g., in consideration of a cell ID or a UE ID). Different resources may be configured for transmission of the SR (or transmission request)/response signal depending on UL-DL configurations.

Figure 16:
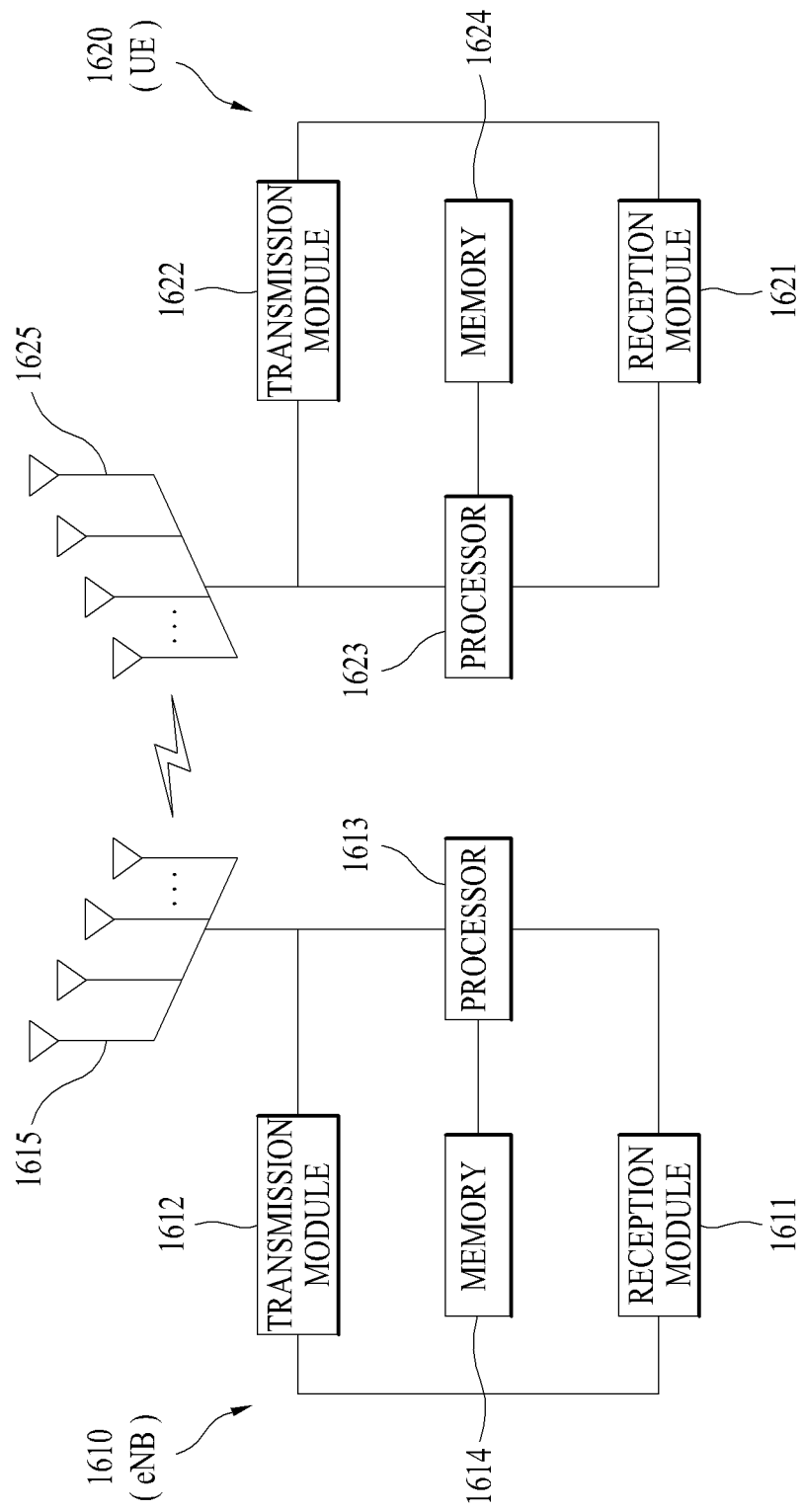
FIG. 16 illustrates structures of a base station device and a user equipment device according to an exemplary embodiment of the present invention.

FIG. 16 is a block diagram of an eNB and a UE according to the present invention.

Referring to FIG. 16, an eNB 1610 according to the present invention may include a reception module 1611, a transmission module 1612, a processor 1613, a memory 1614, and a plurality of antennas 1615. The presence of the plurality of antennas 1615 means that the eNB 1610 supports MIMO transmission and reception. The reception module 1611 may receive UL signals, data, and information from a UE. The transmission module 1612 may transmit DL signals, data, and information to a UE. The processor 1613 may provide overall control to the eNB 1610.

The processor 1613 of the eNB 1610 according to an embodiment of the present invention may implement the afore-described various embodiments.

Besides, the processor 1613 of the eNB 1610 computes and processes information received by the eNB 1610 and information to be transmitted to the outside. The memory 1614 may store the computed and processed information for a predetermined time and may be replaced by a component such as a buffer (not shown).

Referring to FIG. 16 again, a UE 1620 according to the present invention may include a reception module 1621, a transmission module 1622, a processor 1623, a memory 1619, and a plurality of antennas 1625. The presence of the plurality of antennas 1625 means that the UE 1620 supports MIMO transmission and reception. The reception module 1621 may receive DL signals, data, and information from an eNB. The transmission module 1622 may transmit UL signals, data, and information to an eNB. The processor 1623 may provide overall control to the UE 1620.

The processor 1623 of the UE 1620 according to an embodiment of the present invention may implement the afore-described various embodiments.

Besides, the processor 1623 of the UE 1620 computes and processes information received by the UE 1620 and information to be transmitted to the outside. The memory 1624 may store the computed and processed information for a predetermined time and may be replaced by a component such as a buffer (not shown).

The specific configurations of the above-described eNB and UE may be implemented so that the foregoing various embodiments of the present invention may be applied independently or two or more of them may be applied simultaneously. To avoid redundancy, the same description is not provided herein.

In the description of FIG. 16, the description of the eNB 1610 is applicable to a device serving as a DL transmitter or a UL receiver, and the description of the UE 1620 is applicable to a device serving as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the present invention has been described in the context of a 3GPP LTE-based mobile communication system, the present invention is applicable to various other mobile communication systems equally or based on the same principle.

The invention claimed is:

1. A method for transmitting and receiving a signal for Device to Device (D2D) communication with a first terminal by a second terminal in a wireless communication system, the method comprising:
   receiving a first signal from a base station, the first signal indicating that the first terminal has data to be transmitted to the second terminal;
   transmitting a second signal to the base station, the second signal indicating the second terminal wants to receive data of the first terminal;
   receiving a third signal from the first terminal;
   measuring a channel using the third signal and transmitting channel state information to the base station; and
   receiving control information including information used for a communication link between the first terminal and the second terminal from the base station in response to the transmitted channel state information,
   wherein the channel state information is about the communication link between the first terminal and the second terminal.

2. The method according to claim 1, wherein the reception of the third signal comprises receiving the third signal in a resource area indicated by information indicating the communication link between the first terminal and the second terminal.

3. The method according to claim 1, wherein the channel state information includes a scheduling request for a communication link to the first terminal.

4. The method according to claim 3, wherein the scheduling request includes information about a service type and information indicating the communication link between the first terminal and the second terminal.

5. The method according to claim 1, wherein the channel state information includes information indicating the communication link between the first terminal and the second terminal.

6. The method according to claim 1, wherein the channel state information is transmitted via a resource area indicated by information indicating the communication link between the first terminal and the second terminal.

7. The method according to claim 1, wherein the channel state information is transmitted via a resource area indicated by an index of resources in which the third signal is received.

8. The method according to claim 1, wherein if the channel state information includes a scheduling request for a communication link to the first terminal, the control information includes a grant for the scheduling request.

9. The method according to claim 1, wherein the control information includes information about a Modulation and Coding Scheme (MCS) used for the communication link between the first terminal and the second terminal.

10. The method according to claim 1, wherein the second terminal attempts to receive the control information after a predetermined subframe from a subframe in which the channel state information is transmitted.

11. The method according to claim 1, wherein the first terminal is a source station, the second terminal is a destination station, the third terminal is a coordination station, and the third signal is a pilot signal.

12. The method according to claim 1, wherein the first terminal is a destination station, the second terminal is a source station, the third terminal is a coordination station, and the third signal is a sounding signal.

13. The method of claim 1, wherein the third signal is received from the first terminal after the second terminal transmits the second signal to the base station.

14. A second terminal for performing Device to Device (D2D) communication in a wireless communication system, the second terminal comprising:
    a transmission module; and
    a processor,
    wherein the processor
       receives a first signal from a base station, the first signal indicating that the first terminal has data to be transmitted to the second terminal,
       transmits a second signal to the base station, the second signal indicating the second terminal wants to receive data from the first terminal,
       receives a third signal from the first terminal,
       measures a channel using the third signal received from the first terminal,
       transmits channel state information to the base station, and
       receives control information including information used for a communication link between the first terminal and the second terminal from the base station in response to the transmitted channel state information,
    wherein the channel state information is about the communication link between the first terminal and the second terminal.

15. The second terminal of claim 14, wherein the third signal is received from the first terminal after the second terminal transmits the second signal to the base station.

* * * * *